United States Patent
Tsuji et al.

(10) Patent No.: US 10,288,730 B2
(45) Date of Patent: May 14, 2019

(54) ULTRASONIC SENSOR

(71) Applicant: PANASONIC CORPORATION, Osaka (JP)

(72) Inventors: Takashi Tsuji, Mie (JP); Yasushi Nagano, Mie (JP); Naoya Azuma, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 527 days.

(21) Appl. No.: 14/367,124

(22) PCT Filed: Dec. 28, 2012

(86) PCT No.: PCT/JP2012/084148
§ 371 (c)(1),
(2) Date: Jun. 19, 2014

(87) PCT Pub. No.: WO2013/100142
PCT Pub. Date: Jul. 4, 2013

(65) Prior Publication Data
US 2014/0355382 A1 Dec. 4, 2014

(30) Foreign Application Priority Data

Dec. 28, 2011 (JP) ................................. 2011-288755
Dec. 28, 2011 (JP) ................................. 2011-288756
Dec. 28, 2011 (JP) .............................. 20111-288754

(51) Int. Cl.
*G01S 15/04* (2006.01)
*B60R 19/48* (2006.01)
(Continued)

(52) U.S. Cl.
CPC ............ *G01S 15/04* (2013.01); *B60R 19/483* (2013.01); *G01S 7/521* (2013.01); *G01S 2015/938* (2013.01)

(58) Field of Classification Search
CPC ..... G01S 15/04; G01S 7/521; G01S 2015/938
(Continued)

(56) References Cited

U.S. PATENT DOCUMENTS 6,318,774 B1* 11/2001 Karr ...................... B60R 19/483
293/102
7,357,431 B2 4/2008 Sato et al.
(Continued)

FOREIGN PATENT DOCUMENTS

JP     S60-32266 A     2/1985
JP     2000-200653 A   7/2000
(Continued)

OTHER PUBLICATIONS

Japanese to English Machine Translation of JP2009227085.*
(Continued)

*Primary Examiner* — Luke D Ratcliffe
(74) *Attorney, Agent, or Firm* — McDermott Will & Emery LLP

(57) ABSTRACT

An ultrasonic sensor is provided with a mount that is fixed to an inside-face of the bumper, and a sensor body that is coupled to the mount so as to be exposed outside the bumper through an exposure hole that is provided in the bumper. Compared with a case where an ultrasonic sensor is fixed to a bumper by sandwiching the bumper from inside and outside of the bumper, appearance can be improved, since protrusion outward from the bumper is eliminated.

23 Claims, 30 Drawing Sheets

(51) Int. Cl.
  *G01S 7/521* (2006.01)
  *G01S 15/93* (2006.01)
(58) Field of Classification Search
  USPC .......................................................... 367/140
  See application file for complete search history.

(56) References Cited

U.S. PATENT DOCUMENTS

| | | | | |
|---|---|---|---|---|
| 2006/0158066 A1* | 7/2006 | Oda | ........................ | G01S 7/521 310/338 |
| 2006/0232081 A1* | 10/2006 | Sato | ...................... | B60R 19/483 293/117 |
| 2007/0062292 A1* | 3/2007 | Sato | ...................... | B60R 19/483 73/649 |
| 2007/0194892 A1* | 8/2007 | Schaaf | .................... | G01S 7/521 340/435 |

FOREIGN PATENT DOCUMENTS

| | | |
|---|---|---|
| JP | 2001-527480 A | 12/2001 |
| JP | 2005-024351 A | 1/2005 |
| JP | 2006-298010 A | 11/2006 |
| JP | 2009-227085 A | 10/2009 |
| JP | 2010-194441 A | 9/2010 |
| WO | 98/52067 A2 | 11/1998 |

OTHER PUBLICATIONS

International Search Report issued in International Application No. PCT/JP2012/084148 dated Apr. 2, 2013, with English Translation.

* cited by examiner

ULTRASONIC SENSOR

RELATED APPLICATIONS

This application is the U.S. National Phase under 35 U.S.C. § 371 of International Application No. PCT/JP2012/084148, filed on Dec. 28, 2012, which in turn claims the benefit of Japanese Application No. 2011-288754, filed on Dec. 28, 2011, Japanese Application No. 2011-288755, filed on Dec. 28, 2011, and Japanese Application No. 2011-288756, filed on Dec. 28, 2011, the disclosures of which are incorporated by reference herein.

TECHNICAL FIELD

The present invention relates to an ultrasonic sensor.

BACKGROUND ART

Heretofore, there has been provided ultrasonic sensors configured to transmit ultrasonic waves and also to receive ultrasonic waves that are reflected from an obstacle. An example of this type of the ultrasonic sensors is a Doppler sensor that judges presence/absence of an obstacle based on Doppler shift in received ultrasonic waves.

Further, as the ultrasonic sensor described above, there is an ultrasonic sensor that is used in a state in which the ultrasonic sensor is attached to a bumper 1 of an automobile (refer to JP 2010-194441A, for example), as shown in FIG. 43.

In more detail, the ultrasonic sensor in FIG. 43 is fixed to a bumper 1 in a state of being inserted in an exposure hole 11 provided in the bumper 1. The ultrasonic sensor includes an outside block 91 that is inserted in the exposure hole 11 from the outside-face side of the bumper 1 (left side in FIG. 43) and an inside block 92 that is coupled to the outside block 91 from the inside-face side of the bumper 1 (right side in FIG. 43). That is, the ultrasonic sensor is attached to the bumper 1 by the outside block 91 and the inside block 92 being coupled so as to sandwich the bumper 1 therebetween.

However, in a structure in which the bumper 1 is sandwiched between the outside block 91 and the inside block 92 as shown in FIG. 43, since a part of the outside block 91 protrudes from the outside-face of the bumper 1 (left side in FIG. 43), the appearance in a state in which the ultrasonic sensor is attached to the bumper 1 is not good. Moreover, due to the structure in which a part of the outside block 91 inevitably protrudes from the outside-face of the bumper 1, the outside block 91 may be damaged when the bumper 1 comes into contact with an obstacle or the like.

SUMMARY OF INVENTION

The present invention has been made in view of the above-described problems, and an object thereof is to provide an ultrasonic sensor in which the appearance can be improved in a state in which the ultrasonic sensor is attached to a bumper (plate-shaped member).

An ultrasonic sensor according to the present invention includes a mount that is fixed to an inside-face (first face) of a bumper (plate-shaped member), and a sensor body that has at least one of a transmitter configured to transmit an ultrasonic wave and a receiver configured to receive an ultrasonic wave, and is coupled to the mount so as to be exposed to an outside-face side (second face side) of the bumper through an exposure hole provided in the bumper.

It is desirable that, in the ultrasonic sensor, the mount includes a fixing portion that is fixed to the bumper, and a clip portion that is elastically swingable relative to the fixing portion upon receiving operation force. The clip portion is provided with one of a protrusion and a recess, and an outer face of the sensor body is provided with the other of the protrusion and the recess. The protrusion and the recess are configured to engage and disengage with each other according to a swing of the clip portion relative to the fixing portion.

It is desirable that, in the ultrasonic sensor, the mount is provided with one of an engaging hole and an engaging protrusion, and the sensor body is provided with the other of the engaging hole and the engaging protrusion. The engaging hole and the engaging protrusion are configured to engage with each other at a position in which a dimension of protrusion of the sensor body from an end face, facing the inside-face of the bumper, of the mount matches a thickness of the bumper to thereby generate coupling force between the mount and the sensor body. The sensor body is capable of parallel displacement relative to the mount so as to increase the dimension of protrusion of the sensor body to the outside of the bumper compared to the position at which the engaging hole and the engaging protrusion are engaged with each other. The sensor body is provided with one of a temporary engagement hole and a temporary engagement protrusion, and the mount is provided with the other of the temporary engagement hole and the temporary engagement protrusion. The temporary engagement hole and the temporary engagement protrusion are configured to engage with each other in a state in which the sensor body is displaced in parallel relative to the mount so as to increase the dimension of protrusion to the outside of the bumper compared to the position at which the engaging hole and the engaging protrusion are engaged with each other.

It is desirable that, in the ultrasonic sensor, the mount has a dimension and a shape that the sensor body is coupled thereto only from a side of the mount that faces the inside-face of the bumper.

It is desirable that, in the ultrasonic sensor, the mount includes a fixing portion that is fixed to the bumper, and a clip portion that is elastically swingable relative to the fixing portion upon receiving operation force. The clip portion is provided with one of the engaging hole and the engaging protrusion, and an outer face of the sensor body is provided with the other of the engaging hole and the engaging protrusion.

It is desirable that, in the ultrasonic sensor, the temporary engagement protrusion has a truncated pyramid shape or a round shape.

It is desirable that, in the ultrasonic sensor, the mount is configured to be fixed to the bumper by any one of adhesion, riveting, and screwing.

It is desirable that, in the ultrasonic sensor, an outline of an end face of the mount that faces the inside-face of the plate-shaped member is non-circular.

It is desirable that, in the ultrasonic sensor, the mount is provided with a hole for positioning relative to the bumper.

It is desirable that, in the ultrasonic sensor, the sensor body is provided with an elastic contact protrusion that is brought into elastic contact with an inner peripheral face of the exposure hole in a state in which the sensor body is attached to the bumper.

It is desirable that, in the ultrasonic sensor, an outer peripheral face of the sensor body has, on a side of the sensor body exposed through the exposure hole, an end portion made of an elastic material. The end portion is sloped such that a cross-sectional area thereof in a cross section parallel to the outside-face of the bumper increases toward the outside of the bumper.

It is desirable that, in the ultrasonic sensor, the sensor body has an outer peripheral face of which an end portion facing outward from the bumper is sloped such that the outer size thereof increases gradually toward the inside of the bumper.

It is desirable that, in the ultrasonic sensor, the sensor body has a flange portion that is made of an elastic material and covers an opening edge of the exposure hole when viewed from the outside of the bumper.

It is desirable that, in the ultrasonic sensor, the sensor body includes a transmission/reception block that has at least one of the transmitter and the receiver, a body that surrounds the transmission/reception block when viewed from a direction of passing through the exposure hole, and a holding rubber that is made of an elastic material and is interposed between the body and the transmission/reception block over the whole circumference of the transmission/reception block. The holding rubber has a flange portion that covers an opening edge of the exposure hole when viewed from the outside of the bumper.

It is desirable that, in the ultrasonic sensor, the transmission/reception block has a columnar shape, and a cross-sectional shape of the flange portion on the side exposed outside the bumper in a cross-section along an center axis of the transmission/reception block is an arc.

It is desirable that, in the ultrasonic sensor, the flange portion has a ring shape.

It is desirable that, in the ultrasonic sensor, the holding rubber has a portion that is exposed outside when viewed from the outside of the bumper, and a part, around the transmission/reception block, of the portion of the holding rubber is sloped such that a dimension of protrusion from the outside-face of the bumper decreases with increasing proximity to the transmission/reception block.

It is desirable that, in the ultrasonic sensor, the flange portion is provided with a ring-shaped recess for forming, along the periphery of the holding rubber, a ring-shaped cavity between the opening edge of the exposure hole and the flange portion.

It is desirable that, in the ultrasonic sensor, the holding rubber includes an inner-side holding rubber that is interposed between the body and the transmission/reception block over the whole circumference of the transmission/reception block, and an outer-side holding rubber that has the flange portion and covers the inner-side holding rubber when viewed from the outside of the bumper.

It is desirable that, in the ultrasonic sensor, the holding rubber has a bottom portion that is in contact with the transmission/reception block and prevents the transmission/reception block from falling to an inner-side of the bumper.

It is desirable that, in the ultrasonic sensor, an outer peripheral face of the holding rubber is provided with a plurality of outward protrusions that are brought into elastic contact with an inner peripheral face of the body.

It is desirable that, in the ultrasonic sensor, an inner peripheral face of the holding rubber is provided with a plurality of inward protrusions that are brought into elastic contact with an outer peripheral face of the transmission/reception block.

It is desirable that, in the ultrasonic sensor, the holding rubber has the plurality of inward protrusions that are arranged side by side at equal intervals.

It is desirable that, in the ultrasonic sensor, the holding rubber is made of elastomer.

It is desirable that, in the ultrasonic sensor, a portion of the sensor body that is exposed when viewed from the outside of the bumper is colored with the same color as the color of the outside-face of the bumper.

It is desirable that, in the ultrasonic sensor, the sensor body is configured to transmit and receive an ultrasonic wave with a transducer face. The mount includes a plate-shaped fixing portion that is fixed to the inside-face of the bumper, and a holding portion that is coupled to the fixing portion. The fixing portion is provided with an insertion hole. The holding portion is configured to hold the sensor body such that the transducer face is exposed through the insertion hole. A side face of the sensor body is provided with one of an engaging recess and an engaging protrusion, and the holding portion is provided with the other of the engaging recess and the engaging protrusion. The ultrasonic sensor is configured such that the sensor body is attached to the holding portion by engaging the engaging recess and the engaging protrusion with each other. The ultrasonic sensor is configured so that when the sensor body is attached to the holding portion, the transducer face of the sensor body protrudes from the insertion hole of the fixing portion by a predetermined amount.

It is desirable that, in the ultrasonic sensor, the holding portion includes a clip portion that is elastically swingable relative to the fixing portion. A side face of the sensor body is provided with one of the engaging recess and the engaging protrusion, and the clip portion is provided with the other of the engaging recess and the engaging protrusion. The engaging recess and the engaging protrusion are engaged and disengaged by swinging the clip portion.

It is desirable that, in the ultrasonic sensor, the sensor body is configured to transmit and receive an ultrasonic wave with a transducer face. The mount includes a plate-shaped fixing portion that is fixed to the inside-face of the bumper, and a holding portion that is coupled to the fixing portion. The fixing portion is provided with an insertion hole. The holding portion is configured to hold the sensor body such that the transducer face is exposed through the insertion hole. The sensor body has an outer shape that is capable of being inserted in the insertion hole.

According to the present invention, compared with the case where an ultrasonic sensor is fixed to a bumper by sandwiching the bumper from inside and outside of the bumper, appearance can be improved, since protrusion from the bumper is eliminated.

BRIEF DESCRIPTION OF DRAWINGS

FIG. 6A shows a state in a process for fixing, and FIG. 6B shows a state in which fixing is complete;

FIG. 8A shows a state in a process for coupling, and FIG. 8B shows a state in which coupling is complete;

FIG. 10A shows a state in a process for attachment to the bumper, and FIG. 10B shows a state in which attachment to the bumper is complete;

FIGS. 14A and 14B show states in a process for fixing, and FIG. 14C shows a state in which fixing is complete;

FIG. 15A shows a state in a process for fixing, and FIG. 15B shows a state in which fixing is complete;

FIG. 16A shows a state in a process for positioning, and FIG. 16B shows a state in which positioning is complete;

FIG. 18A shows a first modified mode of the ultrasonic sensor of Embodiment 2, and FIG. 18B shows a second modified mode of the ultrasonic sensor of Embodiment 2;

DESCRIPTION OF EMBODIMENTS

Hereinafter, best modes for carrying out the present invention will be described with reference to the diagrams.

An ultrasonic sensor of the present invention is used in a state of being fixed to a predetermined plate-shaped member having an exposure hole. The ultrasonic sensor of the present invention is, specifically, to be mounted in a vehicle (not shown) so as to detect an obstacle in a traveling direction of the vehicle, and is attached such that the direction in which ultrasonic waves are transmitted/received is the forward direction or the rearward direction of the vehicle.

Embodiment 1

An ultrasonic sensor of the present embodiment will be described with reference to FIGS. 1 to 9.

Figure 1:
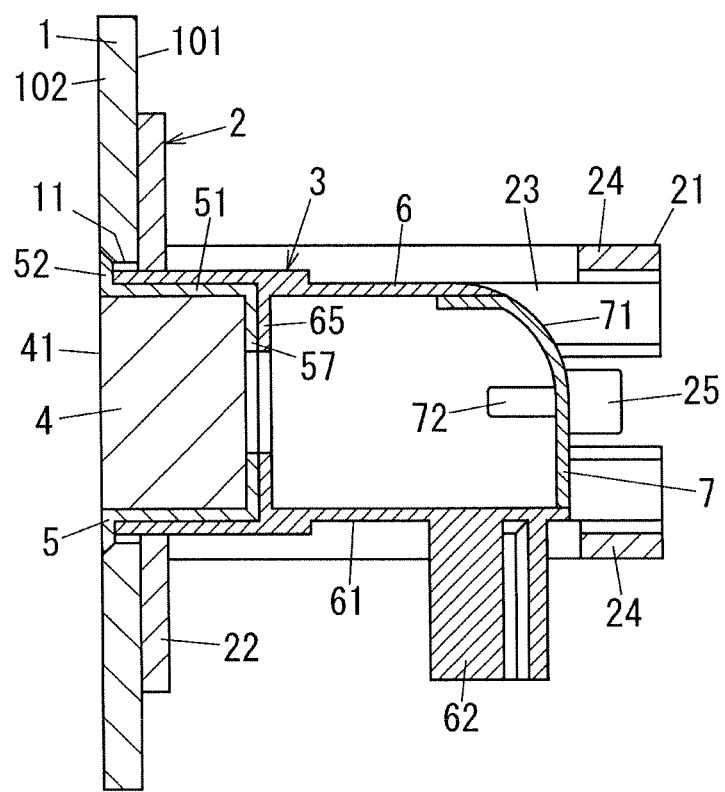
FIG. 1 is a cross-section illustrating an ultrasonic sensor of Embodiment 1.

The ultrasonic sensor of the present embodiment includes, as shown in FIG. 1, a mount 2 that is to be fixed to an inside-face (first face) 101 of a bumper (plate-shaped member) 1 of a vehicle, and a sensor body 3 that has a piezoelectric element serving as a transmitter and a receiver for transmitting and receiving ultrasonic waves, and that is coupled to the mount 2 so as to be exposed through an exposure hole 11 provided in the bumper 1. In the present embodiment, the sensor body 3 is inserted in the exposure hole 11 provided in the bumper 1, and then is coupled to the mount 2. The sensor body 3 transmits ultrasonic waves to the left in FIG. 1 and receives ultrasonic waves from the left in FIG. 1.

Hereinafter, among thickness directions of the bumper 1 and corresponding directions thereof, a direction toward outside (left in FIG. 1) of the bumper 1 is referred to as the forward direction, and a direction toward inside (right in FIG. 1) of the bumper 1 is referred to as the rearward direction. Note that the front-rear direction is defined for convenience of explanation, and does not necessarily match the front-rear direction or the like of a vehicle.

In the present embodiment, the mount 2 and the sensor body 3 are designed such that the front face of the sensor body 3 (transducer face 41 of sensor body 3) is substantially flush with the outside-face (second face) 102 of the bumper 1.

Figure 2:
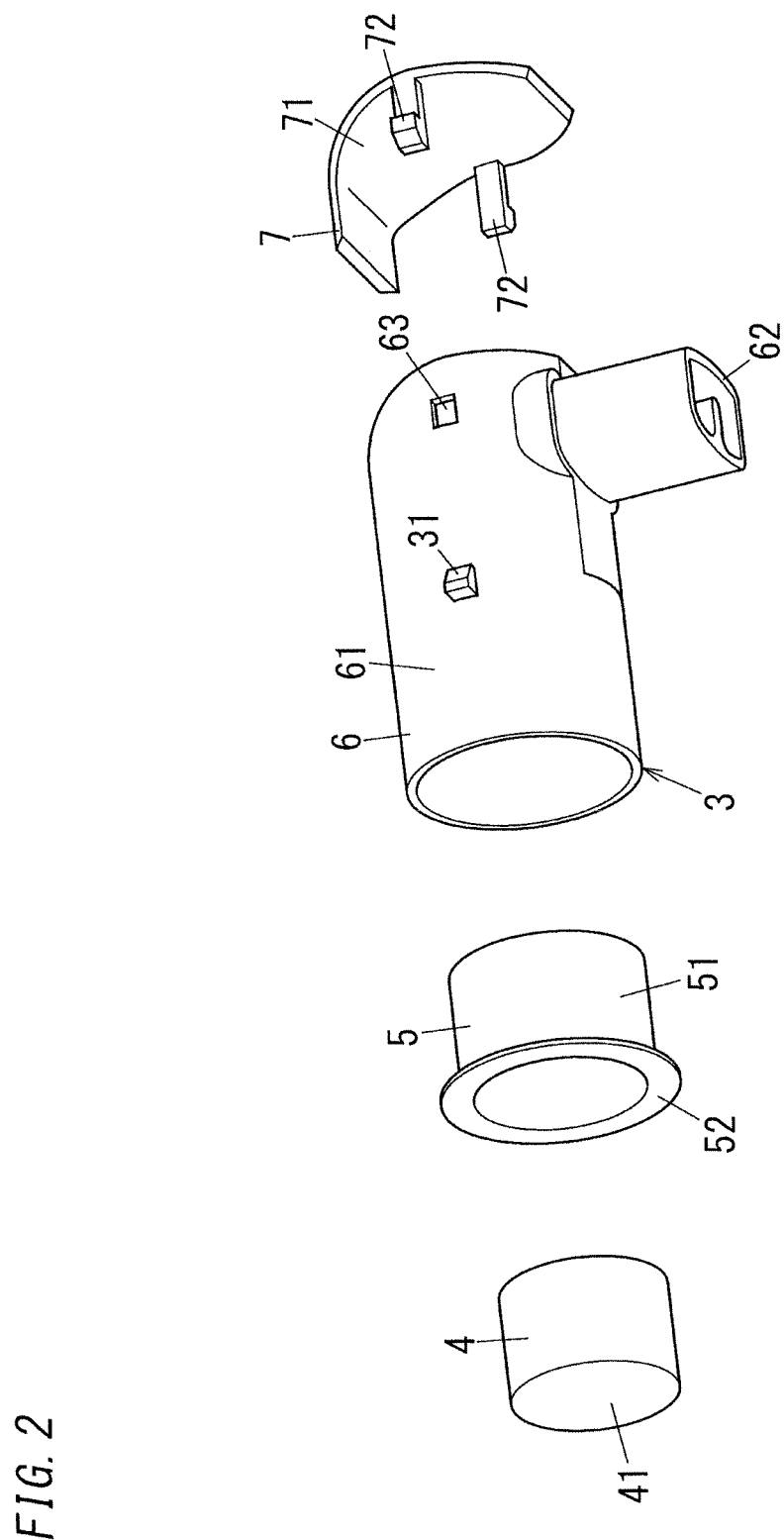
FIG. 2 is an exploded perspective view illustrating a sensor body of the ultrasonic sensor of Embodiment 1.

The sensor body 3 includes, as shown in FIG. 2, a columnar transmission/reception block 4 including a piezoelectric element, a tubular holding rubber 5 that covers the outer peripheral face of the transmission/reception block 4, and a body 6 to which the transmission/reception block 4 with the holding rubber 5 mounted thereto is to be fitted.

That is to say, the sensor body 3 includes the transmission/reception block 4 including at least one of the transmitter and the receiver, the body 6 that surrounds the transmission/reception block 4 when viewed from a direction of passing through the exposure hole 11, and the holding rubber 5 that is made of an elastic material and that is interposed between the body 6 and the transmission/reception block 4 over the whole circumference of the transmission/reception block 4.

For example, the transmission/reception block 4 includes a casing and a piezoelectric element. The casing is constituted by a bottomed cylindrical metal piece whose axial direction is in the front-rear direction and whose rear face is open. The piezoelectric element is fixed to an inner bottom face of the casing. The casing is filled with filler. Ultrasonic waves are emitted from and incident on an outer bottom face 41 (front face; left side face in FIG. 1) of the transmission/reception block 4. That is, the front face 41 of the transmission/reception block 4 serves as a transducer face 41 for transmitting/receiving ultrasonic waves in the sensor body 3.

As a material of the holding rubber 5, an elastic material such as synthetic rubber or elastomer can be used. The holding rubber 5 has a cylindrical shape in which the axial direction thereof is in the front-rear direction, and includes a body portion 51 that surrounds the transmission/reception block 4 and a flange portion 52 that protrudes outward in a radial direction from the front end portion of the body portion 51 (that is, from the end portion facing outward from the bumper 1). Also, the holding rubber 5 includes a bottom portion 57 that is in contact with the transmission/reception block 4 and prevents the transmission/reception block 4 from falling to the inner-side (right in FIG. 1) of the bumper 1.

The flange portion 52 is formed so as to cover the opening edge of the exposure hole 11 when viewed from the outside of the bumper 1. The flange portion 52 is located in front of the front end face of the body 6. The flange portion 52 covers the front end face of the body 6. That is, the transmission/reception block 4 or the holding rubber 5 (flange portion 52) is exposed from the front face (face to which the transmission/reception block 4 is provided) of the sensor body 3. The outer peripheral face of the flange portion 52 has a sloped truncated cone shape such that the outer diameter increases in the forward direction (that is, the cross-sectional area thereof parallel to the outside-face 102 of the bumper 1 gradually increases toward the outside of the bumper 1). That is, the outer peripheral face of the sensor body 3 has, on the side facing outward from the bumper 1, the end portion made of an elastic material, and the end portion is sloped such that the cross-sectional area thereof in a cross section parallel to the outside-face 102 of the bumper 1 increases toward the outside of the bumper 1 (i.e., increases from the first face 101 toward the second face 102). The bottom portion 57 has a ring shape in which outer periphery thereof is joined to the body portion 51. Wiring (not shown) that is to be connected to the transmission/reception block 4 is inserted in a hole provided in the bottom portion 57.

The body 6 is made of a synthetic resin, for example, and includes a tube-shaped body portion 61 that is open at front and rear ends and covers the outer peripheral face of the holding rubber 5, and a connector portion 62 that projects from a rear end portion (right end portion in FIG. 2) of the body portion 61 in a direction (downward in FIG. 1) orthogonal to the axial direction of the body portion 61. The body portion 61 houses a signal processing circuit (not shown) that is electrically connected to the piezoelectric element and performs appropriate signal processing such as amplification or noise removal. Also, the connector portion 62 has a tube shape in which the axial direction thereof is orthogonal (the axial direction thereof is in the up-and-down direction in FIG. 2) to the axial direction of the body portion 61, and has a plurality of contacts (not shown) that are made of a conductive material, are exposed inside the connector portion 62, and are electrically connected to the aforementioned signal processing circuit. The signal processing circuit is electrically connected to an external circuit through a plug (not shown) that has a plurality of terminals to be electrically connected with the respective contacts and that is to be inserted into and connected to the connector portion 62. Also, as shown in FIG. 1, in the ultrasonic sensor of the present embodiment, the body 6 is provided with a bottom portion 65 that prevents falling of the transmission/reception block 4 (holding rubber 5). The bottom portion 65 has a ring shape in which the outer periphery thereof is linked to the body portion 61. The wiring (not shown) that is to be connected to the transmission/reception block 4 is inserted in a hole that is provided in the bottom portion 65.

Also, the sensor body 3 includes a cover 7 that is coupled to the body 6 and closes an opening at the rear side of the body portion 61. The cover 7 is made of a synthetic resin, for example, and includes a plate-shaped body portion 71 in which the thickness direction thereof is in the front-rear direction (left-right direction in FIG. 2) and coupling claws 72 that project from respective ends of the body portion 71 in the width direction thereof toward one side (forward direction; left in FIG. 2) in the thickness direction of the body portion 71. Each coupling claw 72 has a hook shape in which a tip end portion thereof is bent outward (in a direction away from the other coupling claw 72). Coupling holes 63 for putting the inside and outside of the body portion 61 into communication are provided on both sides of the body portion 61 in a direction orthogonal to the projecting direction of the connector portion 62 (on both sides of the body portion 61 at the rear end portion thereof in the front-rear direction in FIG. 2). Due to the tip end portions of the coupling claws 72 being inserted to the respective coupling holes 63, the cover 7 is attached to the body 6.

Figure 3:
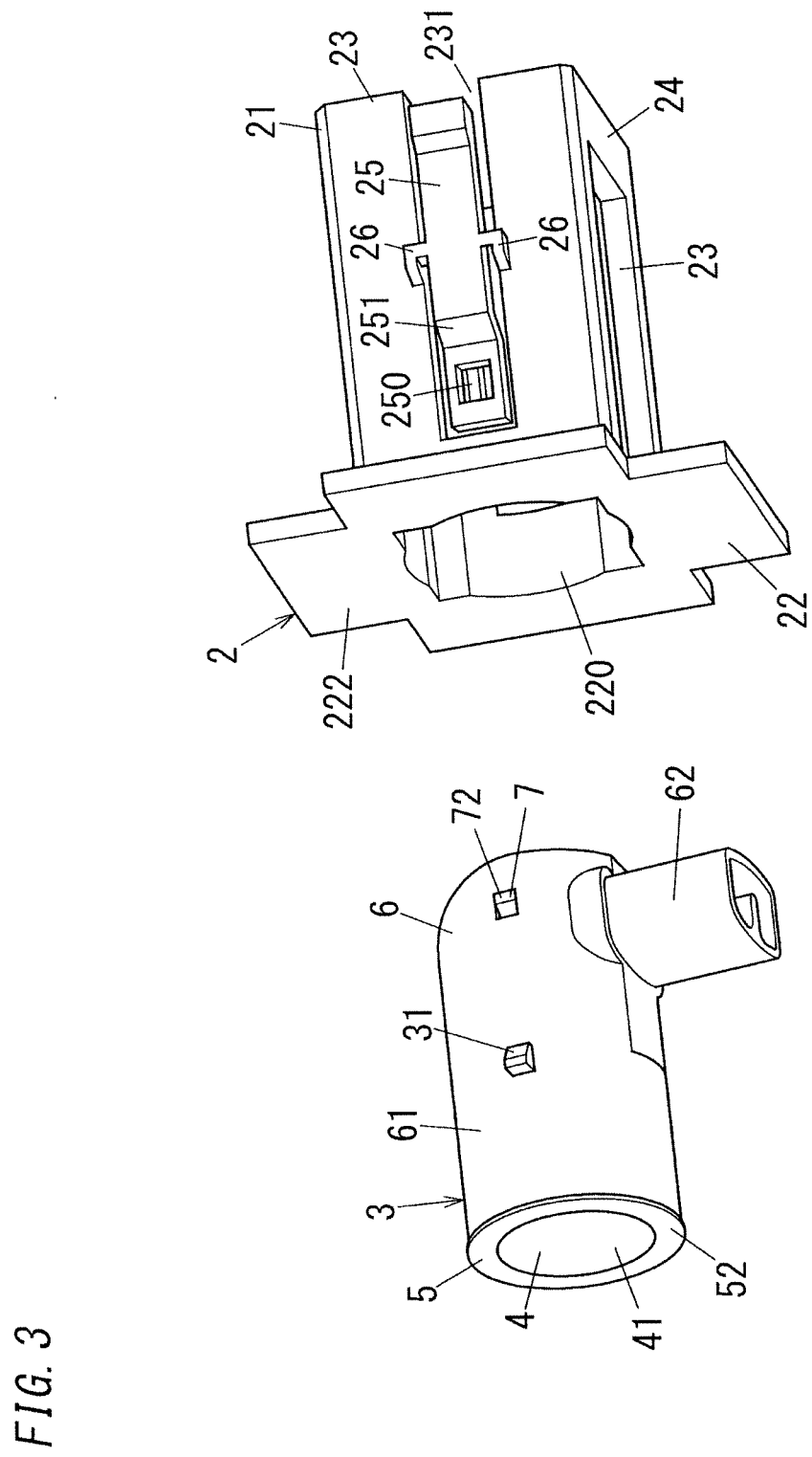
FIG. 3 is an exploded perspective view illustrating the ultrasonic sensor of Embodiment 1.
Figure 4:
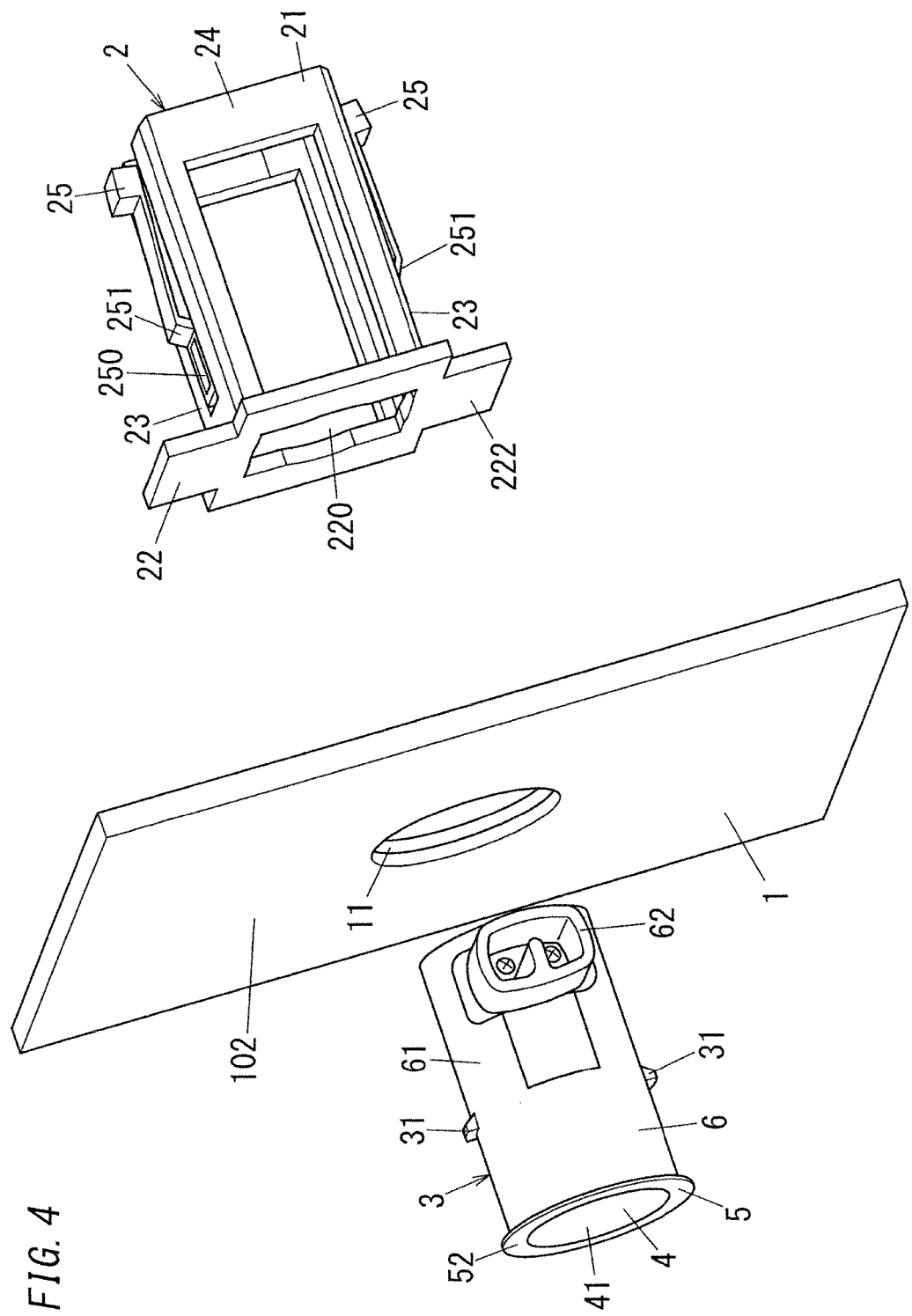
FIG. 4 is an exploded perspective view illustrating the ultrasonic sensor of Embodiment 1 viewed from below in FIG. 3.

Next, the mount 2 will be described. The mount 2 includes, as shown in FIGS. 3 and 4, a holding portion 21 that holds the sensor body 3 and a fixing portion 22 that protrudes from a front end portion (left end portion in FIG. 3) of the holding portion 21 in a direction along the inside-face 101 of the bumper 1 (both upward and downward in FIG. 3) and is fixed to the inside-face 101 of the bumper 1. That is, the mount 2 includes the plate-shaped fixing portion 22 that is to be fixed to the inside-face 101 of the bumper 1 and the holding portion 21 that is coupled to the fixing portion 22.

The fixing portion 22 is a cross-shaped plate in which a thickness direction thereof is in the front-rear direction, and is fixed to the bumper 1 such that a front face 222 thereof faces the bumper 1. Also, an insertion hole 220 is formed in the fixing portion 22. That is, in a center portion of the fixing portion 22, the insertion hole 220 is provided so as to pass through in the thickness direction for inserting the sensor body 3.

Figure 5:
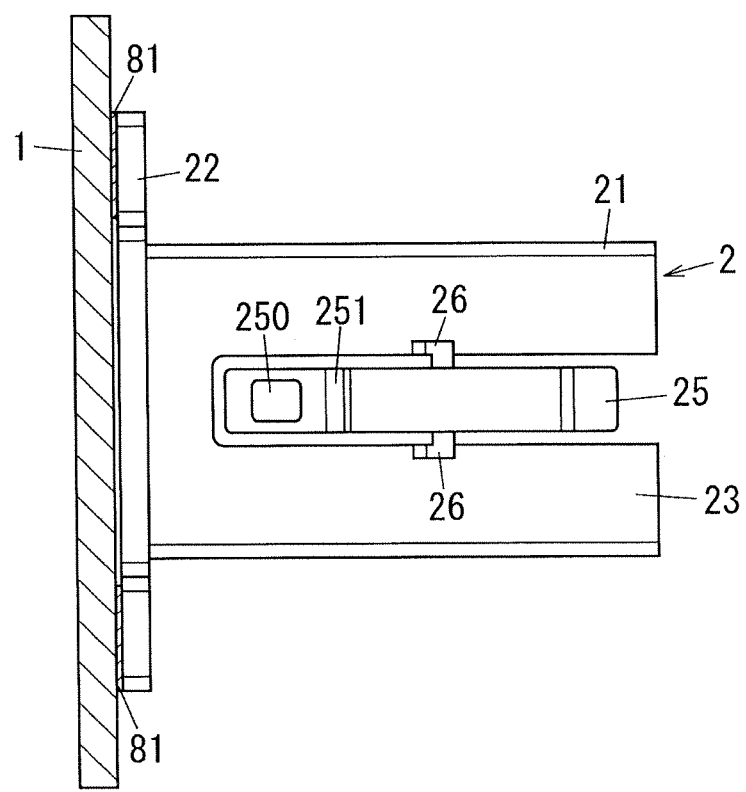
FIG. 5 is a cross-section illustrating an example of a method for fixing a mount to a bumper.
Figure 6A:
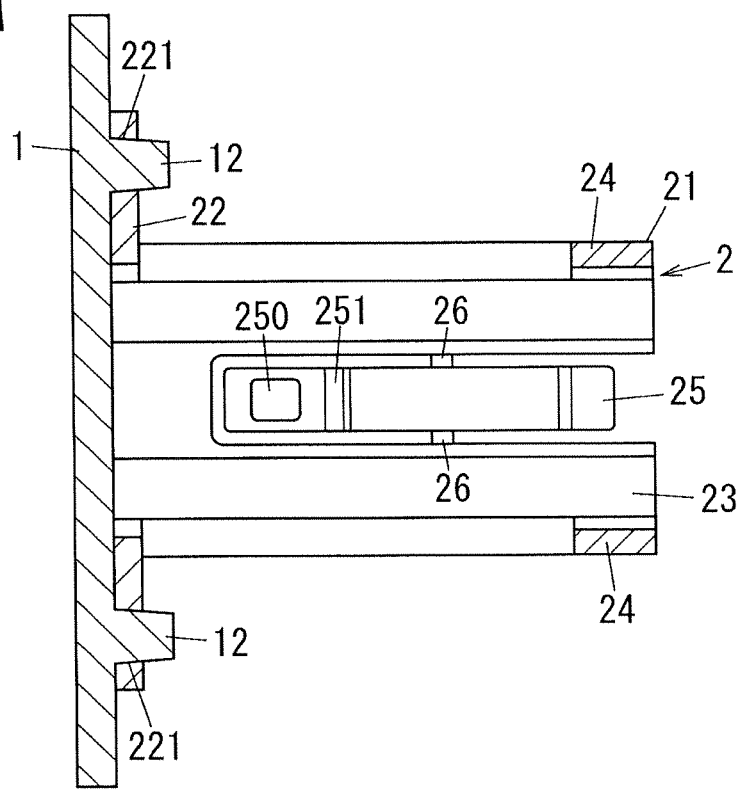
FIGS. 6A and 6B are cross-sections illustrating another example of the method for fixing the mount to the bumper.
Figure 6B:
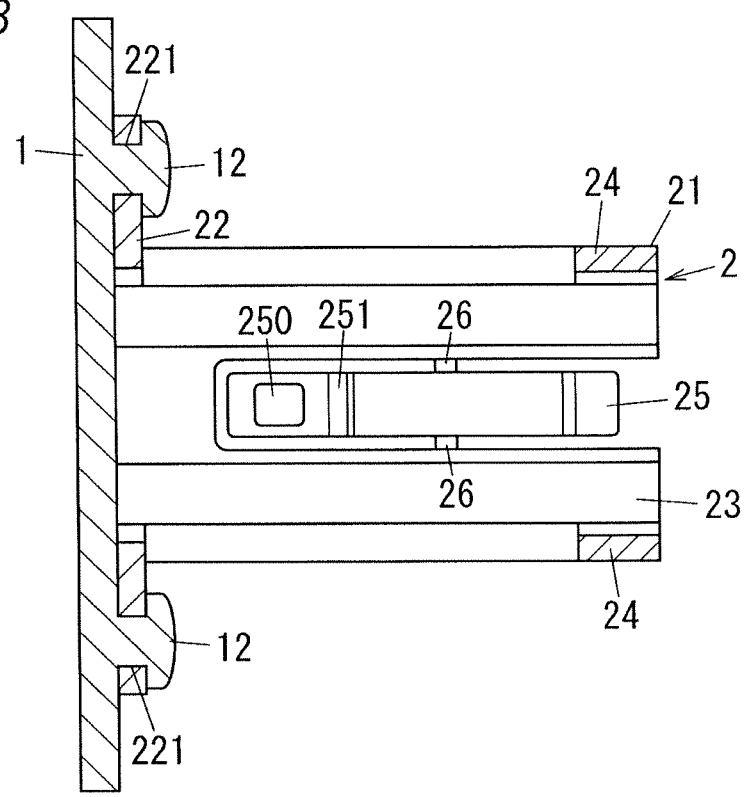
Figure 7:
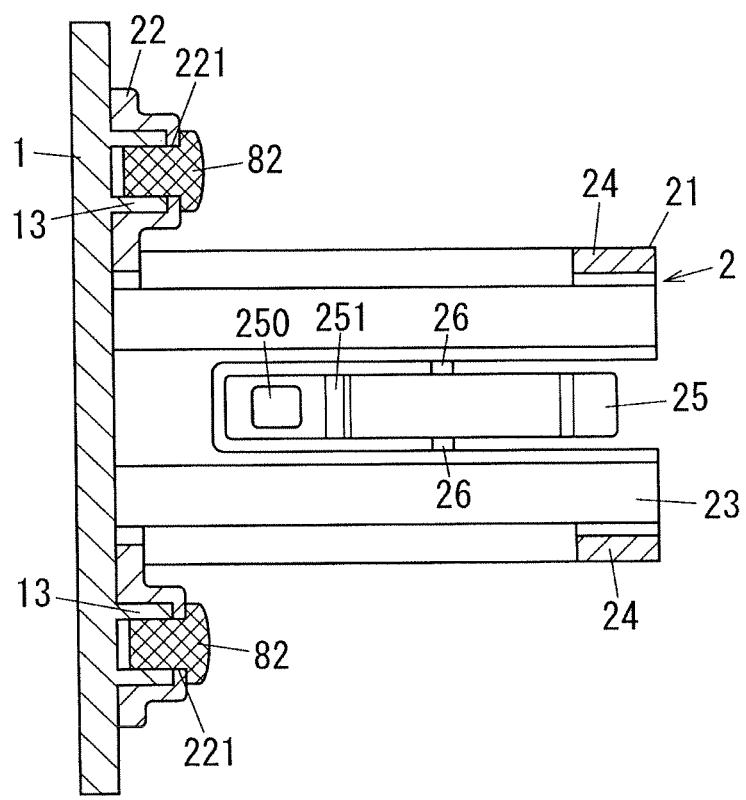
FIG. 7 is a cross-section illustrating a yet another example of the method for fixing the mount to the bumper.

As a fixing method for fixing the fixing portion 22 to the inside-face 101 of the bumper 1 (rear face of bumper 1), adhesion by an adhesive sheet 81, as shown in FIG. 5, can be used, for example. By interposing the adhesive sheet 81 between the front face 222 of the fixing portion 22 and the inside-face 101 of the bumper 1, the fixing portion 22 can be fixed to the bumper 1. Also, as a fixing method, as shown in FIGS. 6A and 6B, riveting may be used in which rivet protrusions 12 that each project from the inside-face 101 of the bumper 1 are inserted to a positioning hole 221 provided in the fixing portion 22 and riveted (that is, tip end portions of the rivet protrusions 12 are plastic-deformed due to heat or pressure so as not to come out of the positioning holes 221). Alternatively, as a fixing method, as shown in FIG. 7, screwing by screws 82 that each are inserted in the positioning hole 221 of the fixing portion 22 and are screwed to the bumper 1 may be used. In the example in FIG. 7, a plurality of (four, at positions surrounding the exposure hole 11 from four sides, for example) tube-shaped screwing protrusions 13 protrude from the inside-face of the bumper 1, in each of which a thread groove is provided on an inner peripheral face and the screw 82 is screwed thereto.

The holding portion 21 is configured to hold the sensor body 3 such that the transducer face 41 is exposed through the insertion hole 220 of the fixing portion 22.

The holding portion 21 includes two sandwiching portions 23 (a near-side sandwiching portion 23 and a rear-side sandwiching portion 23 in FIG. 3), one end portion (left end portion in FIG. 3) of each being coupled to the fixing portion 22, that sandwich therebetween the sensor body 3, and two linking portions 24 that are provided between rear upper end portions of the two sandwiching portion 23 and between rear lower end portions thereof, respectively, so as to maintain the distance between the sandwiching portions 23. Further, in the holding portion 21, a cutout 231 is formed in each sandwiching portion 23 in the lengthwise direction of the sandwiching portion 23 (from the rear end of the sandwiching portion 23 toward the fixing portion 22). That is, each sandwiching portion 23 is formed in a substantially U shape.

The holding portion 21 includes clip portions 25 that elastically swing relative to the fixing portion 22. That is, a clip portion 25 is arranged in a cutout 231 of each sandwiching portion 23 so that the clip portion 25 is linked to a corresponding sandwiching portion 23 in an elastically swingable manner. The clip portions 25 are provided on the respective sides that sandwich the sensor body 3. Each clip portion 25 has an elongated shape in the projecting direction in which the sandwiching portion 23 projects from the fixing portion 22 (left-right direction in FIG. 3). Due to the center portion of the clip portion 25 in the lengthwise direction being linked to the sandwiching portion 23 via elastically deformable spring portions 26, the clip portion 25 is elastically swingable relative to the sandwiching portion 23 (that is, relative to the fixing portion 22). Also, each clip portion 25 is formed with a step 251 such that the end portion, (left end portion in FIG. 3) near the fixing portion 22, of the clip portion 25 is located closer to the sensor body 3 (inner side in the front-rear direction in FIG. 3) than other portions of the clip portion 25 in a state in which the spring portions 26 are elastically returned. In each clip portion 25, an engaging hole (engaging recess) 250 is provided in a portion on the fixing portion 22 side (left side in FIG. 3) relative to the step 251. Further, in the body portion 61 of the body 6, engaging protrusions 31 are provided on faces that oppose the respective clip portions 25. Each engaging protrusion 31 has a truncated pyramid shape in which the rear face thereof is sloped such that the cross-sectional area in a cross-section orthogonal to the projection direction decreases toward the tip end thereof.

Figure 8A:
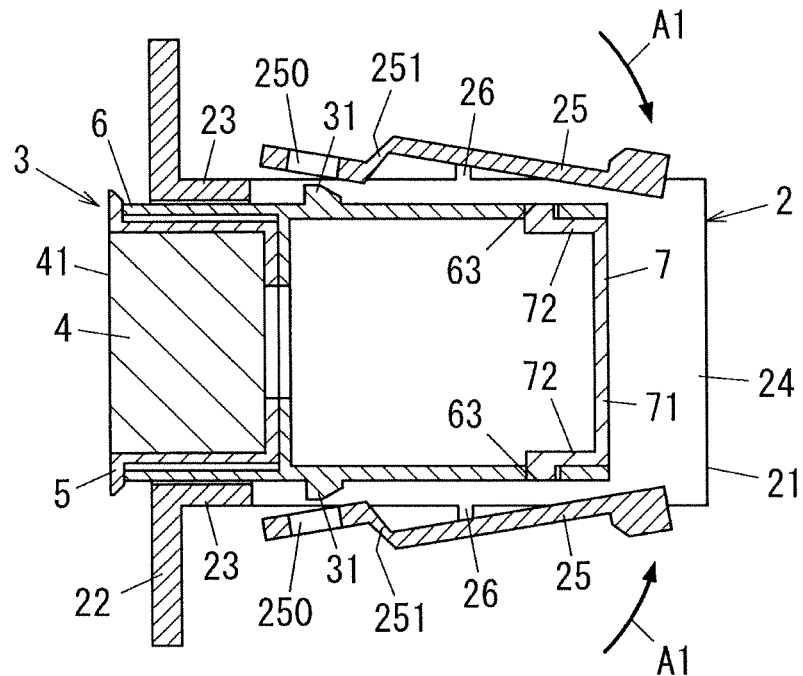
FIGS. 8A and 8B are cross-sections illustrating a method for coupling a sensor body to the mount.
Figure 8B:
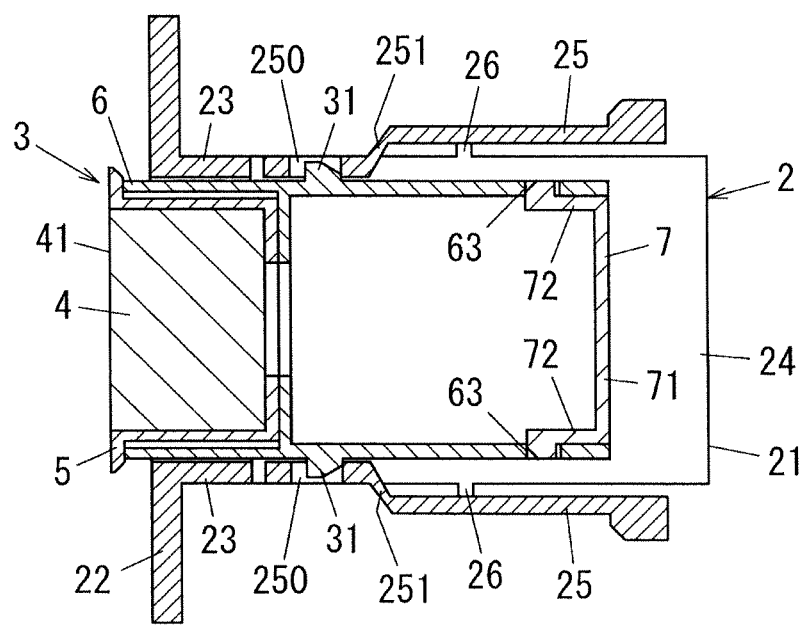

When the sensor body 3 is coupled to the mount 2, in each clip portion 25, by applying inward pressing force (pressing force in the up-down direction in FIG. 8A) as shown by arrows A1 in FIG. 8A at the end portion (right end portion in FIG. 8A) thereof that is distant from the fixing portion 22, the end portion (left end portion in FIG. 8A) of the clip portion 25 on the fixing portion 22 side is displaced so as to separate from the sensor body 3. Next, the positions of the engaging protrusions 31 of the sensor body 3 are aligned with the positions of the corresponding engaging holes 250, and the pressing force is released in this state. Then, as shown in FIG. 8B, each clip portion 25 returns to the original position due to spring force of the spring portions 26, and each engaging protrusion 31 is inserted in the corresponding engaging hole 250, and thereby coupling between the sensor body 3 and the mount 2 is complete.

That is to say, the clip portion 25 is provided with one of recess and protrusion (250 and 31), and the outer face of the sensor body 3 is provided with the other of the recess and the protrusion (250 and 31). The recess and the protrusion (250 and 31) are configured to engage and disengage with each other according to a swing of the clip portion 25 relative to the fixing portion 22.

In other words, the side face of the sensor body 3 is provided with one of an engaging recess and an engaging protrusion, and the holding portion 21 is provided with the other of the engaging recess and the engaging protrusion. Specifically, the side face of the sensor body 3 is provided with one of the engaging recess and the engaging protrusion, and the clip portion 25 is provided with the other of the engaging recess and the engaging protrusion. The ultrasonic sensor is configured such that the sensor body 3 is attached to the holding portion 21 by engaging each engaging recess with corresponding engaging protrusion. Specifically, by swinging the clip portions 25, the engaging recesses and the corresponding engaging protrusions are engaged and disengaged.

In order to attach the ultrasonic sensor of the present embodiment to the bumper 1, first, the mount 2 is fixed to the inside-face 101 of the bumper 1 aligned with the position of the exposure hole 11 of the bumper 1. Next, the sensor body 3 is coupled to the mount 2. Here, the sensor body 3 can be inserted into the exposure hole 11 from the outside of the bumper 1 (from the left side in FIG. 1) (that is, the insertion hole 220 is formed in a shape in which the sensor body 3 can be inserted). Specifically, the sensor body 3 is rotated counterclockwise approximately 90 degrees from the state shown in FIG. 1, the connector portion 62 is first inserted into the exposure hole 11 from the outside of the bumper 1, thereafter the sensor body 3 is rotated relative to the bumper 1 and the mount 2 (clockwise in FIG. 1 about a connection portion between the body portion 61 and the connector portion 62), and as a result the body portion 61 can be inserted in the exposure hole 11 following the connector portion 62. Thereafter, the sensor body 3 may be pushed in the rearward direction (right in FIG. 1) relative to the bumper 1 and the mount 2 such that the engaging protrusions 31 are engaged with corresponding engaging holes 250.

For this reason, the body 6 is constituted by the body portion 61 and the connector portion 62. The body portion 61 is formed in a tubular shape, and the connector portion 62 is formed in a tubular shape. The outer diameters of the body portion 61 and the connector portion 62 are made smaller than the diameters of the insertion hole 220 and the exposure hole 11.

Since the sensor body 3 can be inserted into the exposure hole 11 from the outside of the bumper 1 and attaching it to the mount 2 after the mount 2 is fixed to the inside-face of the bumper 1 as described above, the front face (transducer face 41), which is exposed through the exposure hole 11 of the bumper 1, of the sensor body 3 is less likely to be damaged, compared with a case where the mount 2 is fixed to the inside-face of the bumper 1 after the sensor body 3 is coupled to the mount 2. Note that the protrusion and the recess can be reversed compared to the aforementioned configuration, and a structure can be adopted in which an engaging protrusion provided on the clip portion 25 is inserted into an engaging hole provided in the outer face of the sensor body 3.

Here, the amount of protrusion of the sensor body 3 in the forward direction of the mount 2 in a state in which the mount 2 and the sensor body 3 are coupled to each other is made similar to the thickness (dimension in the left-right direction in FIG. 1) of the bumper 1 to which attachment is envisioned. That is, the positions of the protrusions and recesses that are provided in the clip portions 25 and the sensor body 3 are set such that, when the sensor body 3 is attached to the mount 2, the front face (transducer face 41) of the sensor body 3 protrudes from the front face 222 of the mount 2 by a predetermined amount. In other words, the ultrasonic sensor is held in a state in which, when the sensor body 3 is attached to the holding portion 21, the transducer face 41 of the sensor body 3 protrudes from the insertion hole 220 of the fixing portion 22 by the predetermined amount. Thus, in a state in which the ultrasonic sensor of the present embodiment is attached to the bumper 1, the front face of the sensor body 3 is substantially flush with the outside-face (front face) 102 of the bumper 1.

Figure 9:
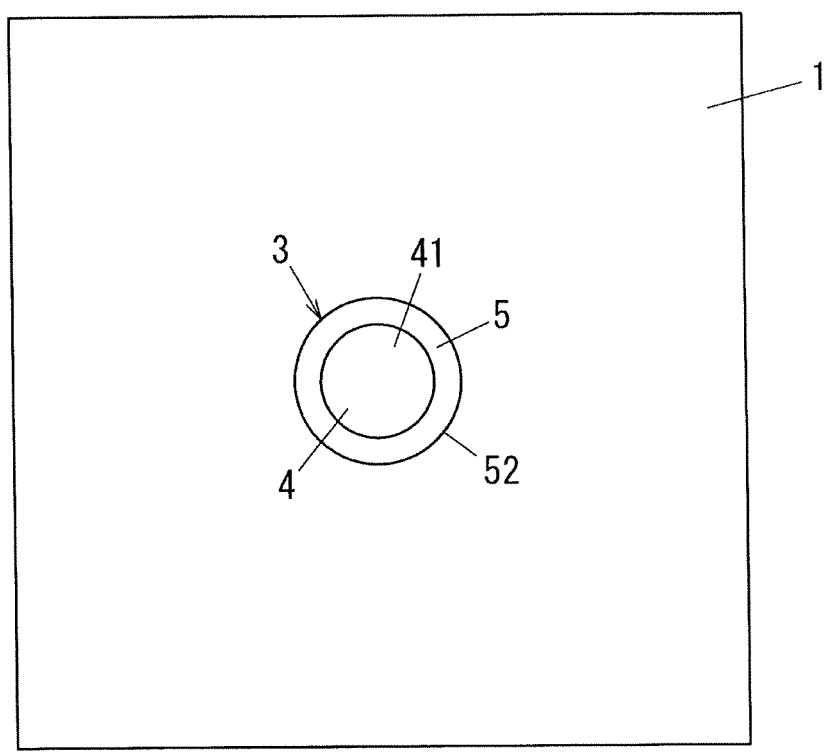
FIG. 9 is a front view of the ultrasonic sensor of Embodiment 1 in a state in which attachment thereof to the bumper is complete.

Also, when the size of the exposure hole 11 is appropriate, in a state in which the ultrasonic sensor of the present embodiment is attached to the bumper 1, the flange portion 52 of the holding rubber 5 is brought into elastic contact with the inner peripheral face of the exposure hole 11, as shown in FIG. 9. Further, in the present embodiment, since the outer peripheral face of the flange portion 52 is sloped such that the cross-sectional area of the flange portion 52 in a cross-section parallel to the outside-face 102 of the bumper 1 gradually increases toward the outside of the bumper 1 (left in FIG. 1), the inner peripheral face of the exposure hole 11 can be entirely covered by the flange portion 52.

Figure 43:
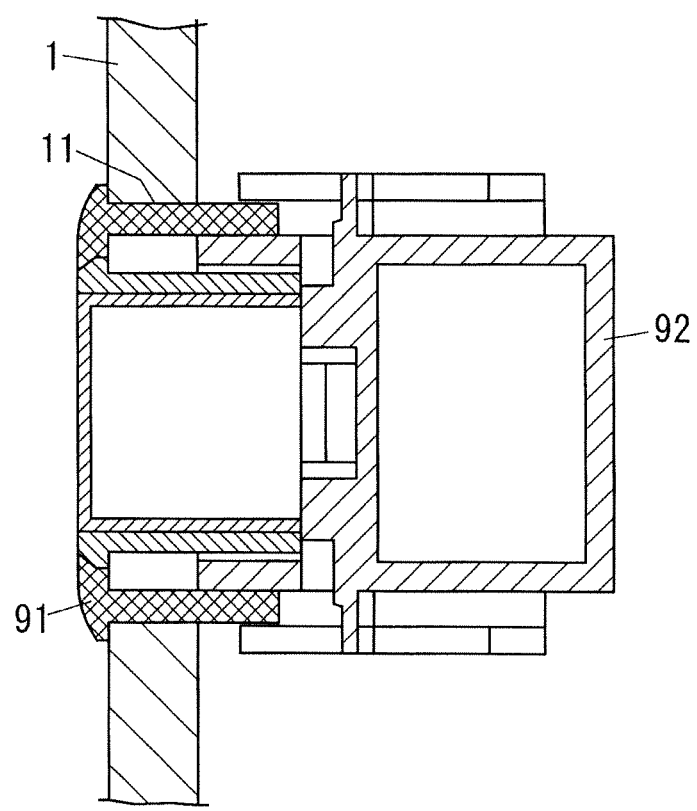
FIG. 43 is a cross-section illustrating a conventional example.

According to the configuration described above, the ultrasonic sensor does not protrude outward from the bumper 1, and therefore appearance can be improved compared with the case where the ultrasonic sensor is attached to the bumper 1 by sandwiching the bumper 1 from the outside and inside thereof, as the conventional example shown in FIG. 43

Note that in order to improve the appearance in a state in which the ultrasonic sensor is attached to the bumper 1, it is desirable that a portion of the sensor body 3 that is exposed through the exposure hole 11 when viewed from the outside of the bumper 1 is colored with the same color as the color of the front face of the bumper 1. That is, when the color of the bumper 1 to which the ultrasonic sensor is to be attached is determined, the transmission/reception block 4 and the holding rubber 5 is colored or painted the same color.

Embodiment 2

An ultrasonic sensor of the present embodiment will be described with reference to FIGS. 10 to 26. Note that constituent elements similar to those in Embodiment 1 are provided with the same reference numerals, and description thereof will be omitted as appropriate.

Figure 10A:
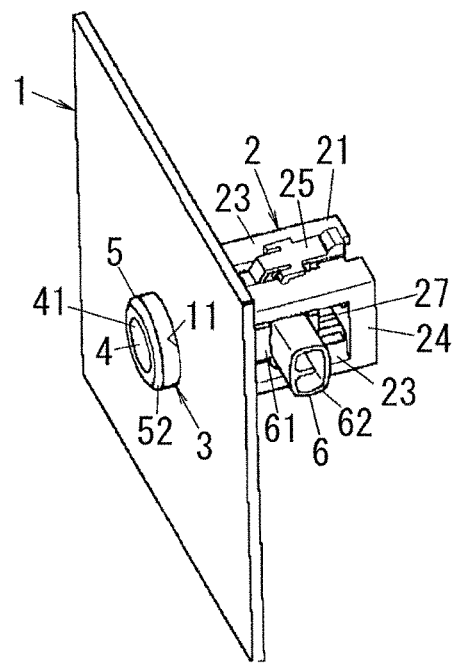
FIGS. 10A and 10B are perspective views illustrating an ultrasonic sensor of Embodiment 2.
Figure 10B:
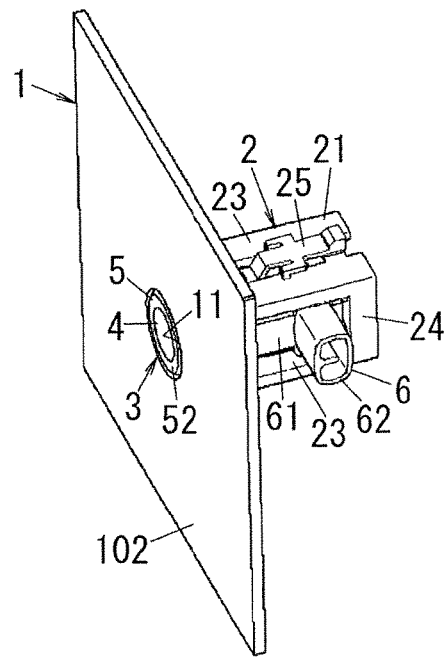
Figure 11:
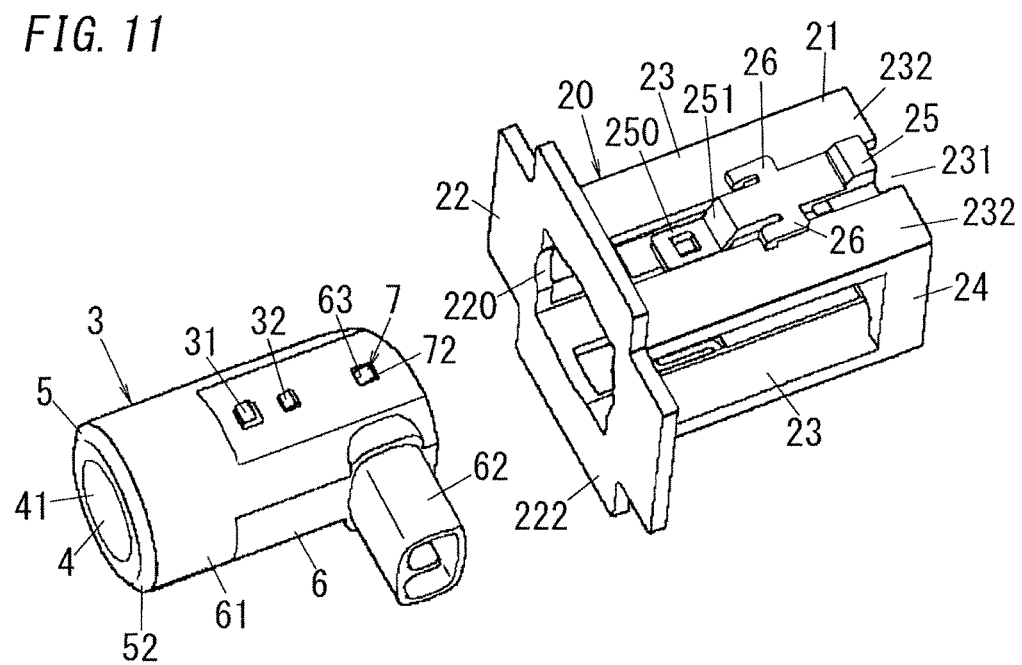
FIG. 11 is an exploded perspective view illustrating the ultrasonic sensor of Embodiment 2.

The ultrasonic sensor of the present embodiment includes, as shown in FIGS. 10 and 11, a mount 2 that is to be fixed to a inside-face (first face) 101 of a bumper (plate-shaped member) 1 of a vehicle, and a sensor body 3 that has a piezoelectric element serving as a transmitter and receiver for transmitting and receiving ultrasonic waves, and that is exposed through an exposure hole 11 provided in the bumper 1, in a state of being coupled to the mount 2.

Figure 12:
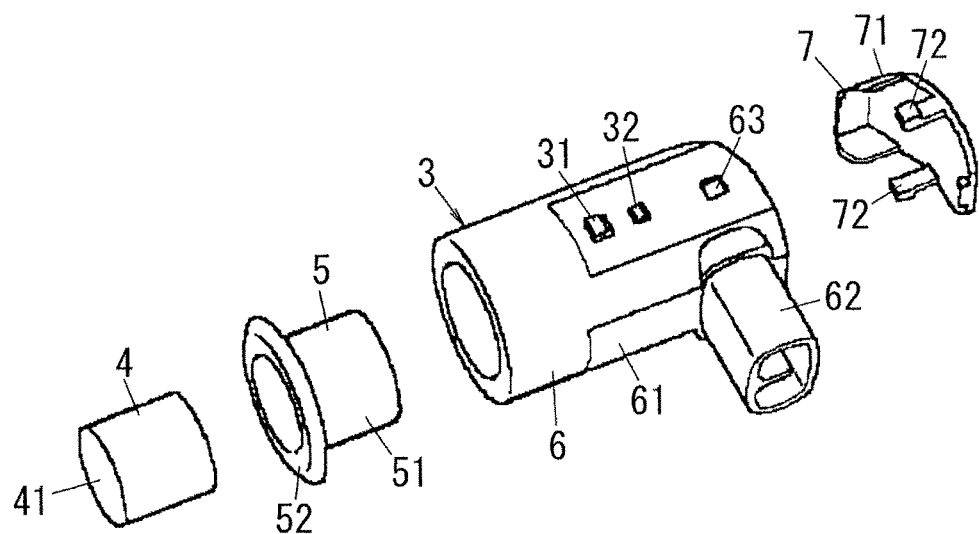
FIG. 12 is an exploded perspective view illustrating a sensor body of the ultrasonic sensor of Embodiment 2.

The sensor body 3 includes, as shown in FIG. 12, a columnar transmission/reception block 4 including a piezoelectric element, a tubular holding rubber 5 that covers the outer peripheral face of the transmission/reception block 4, and a body 6 to which the transmission/reception block 4 with the holding rubber 5 mounted thereto is to be fitted.

The ultrasonic sensor of the present embodiment also includes a flange portion 52 that is made of an elastic material and covers an opening edge of the exposure hole 11 when viewed from the outside of the bumper 1. That is, the ultrasonic sensor of the present embodiment includes, as shown in FIG. 12, the holding rubber 5 made of an elastic material on which the flange portion 52 is formed. In the present embodiment, an outer peripheral face of the flange portion 52 of the holding rubber 5 has a sloped truncated cone shape in which the outer diameter decreases (that is, the cross-sectional area of the flange portion 52 parallel to the outside-face 102 of the bumper 1 decreases) in the forward direction (that is, toward outside of the bumper 1). That is, the outer peripheral face of the end portion of the sensor body 3 that faces outward from the bumper 1 is sloped such that the diameter of the outer peripheral face gradually increases toward inside of the bumper 1. Accordingly, when the sensor body 3 is inserted into the exposure hole 11 from the inside (rear side) of the bumper 1, insertion of the sensor body 3 is relatively easy.

Next, the mount 2 includes, as shown in FIG. 11, a holding portion 21 that holds the sensor body 3 and a fixing portion 22 that protrudes from a front end portion (left end portion in FIG. 11) of the holding portion 21 in a direction along the inside-face 101 of the bumper 1 and is fixed to the inside-face 101 of the bumper 1.

Figure 13:
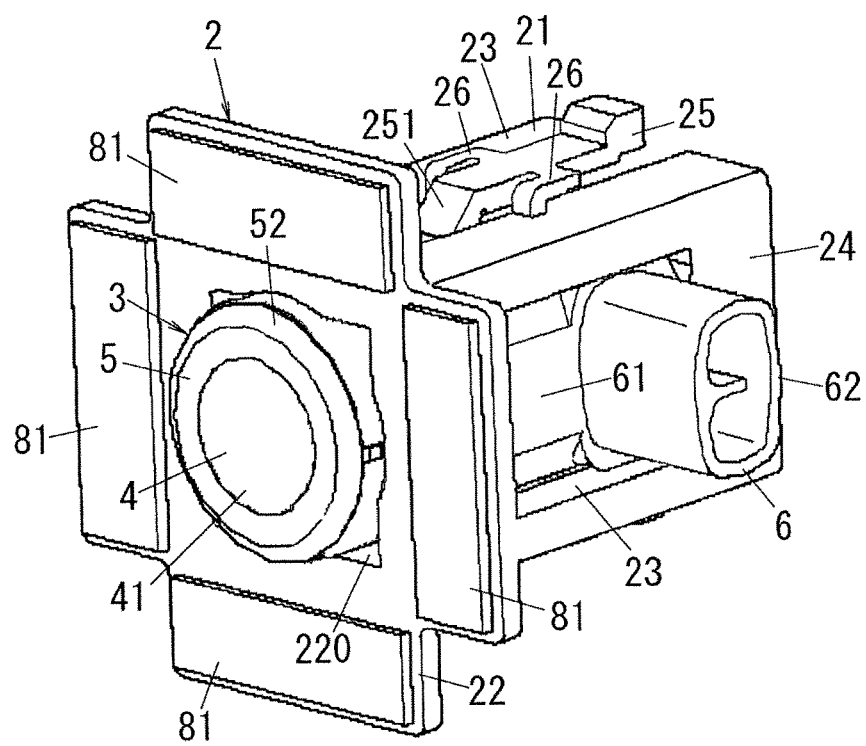
FIG. 13 is a perspective view illustrating a state in which adhesive sheets are adhered to the ultrasonic sensor of Embodiment 2.
Figure 14C:
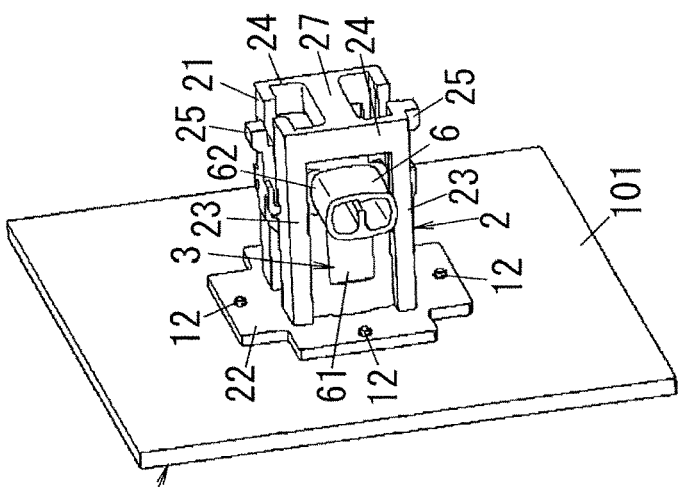
FIGS. 14A to 14C are perspective views illustrating a method for fixing the ultrasonic sensor of Embodiment 2 to the bumper by riveting.
Figure 14B:
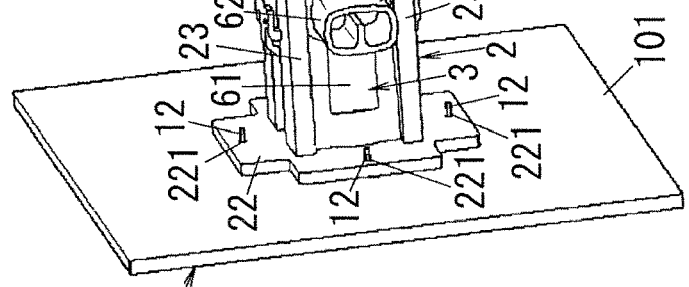
Figure 14A:
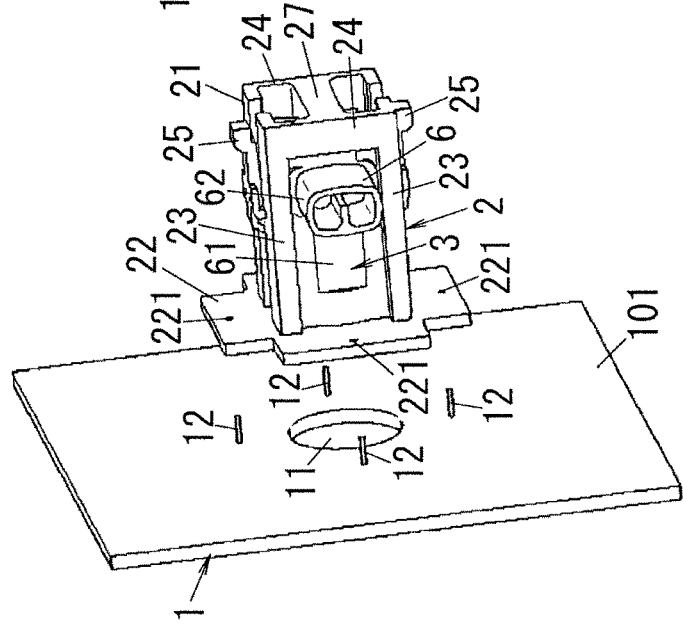
Figure 15A:
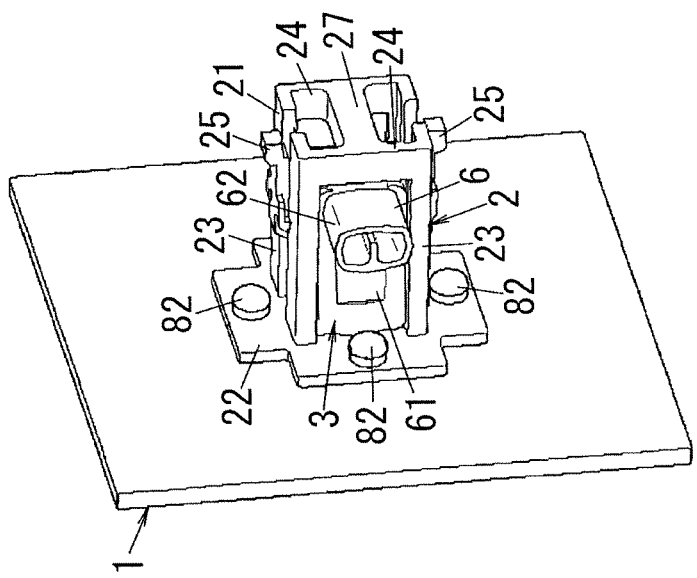
FIGS. 15A and 15B are perspective views illustrating a method for fixing the ultrasonic sensor of Embodiment 2 to the bumper by screwing.
Figure 15B:
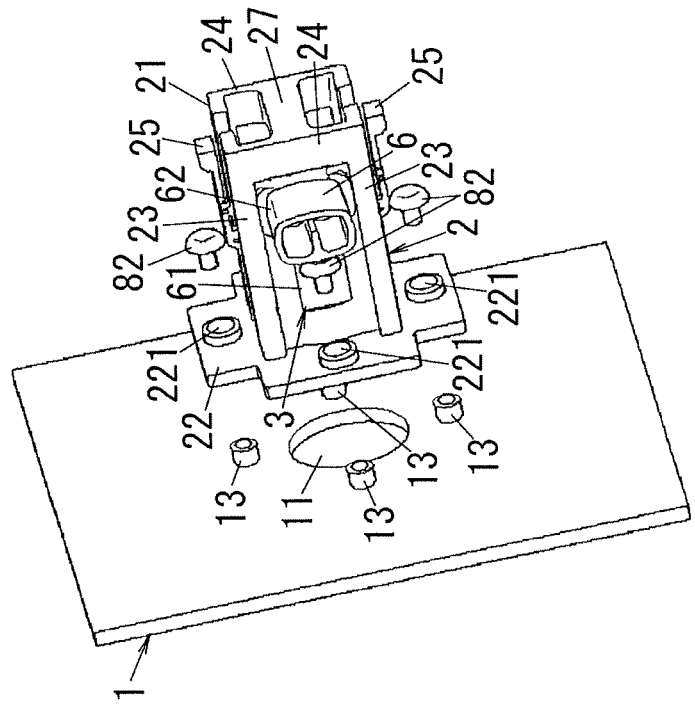

As a fixing method for fixing the fixing portion 22 to the inside-face (rear face) 101 of the bumper 1, a method similar to the method in Embodiment 1 can be used. For example, adhesion by interposing an adhesive sheet 81 between the fixing portion 22 and the inside-face 101 of the bumper 1 can be used, as shown in FIG. 13. Also, as a fixing method, as shown in FIGS. 14A to 14C, riveting may be used in which rivet protrusions 12 that project from the inside-face 101 of the bumper 1 are each inserted to a positioning hole 221 provided in the fixing portion 22 and riveted (that is, tip end portions of the rivet protrusions 12 are plastic-deformed due to heat or pressure so as not to come out of the positioning holes 221). Alternatively, as a fixing method, as shown in FIGS. 15A and 15B, screwing by screws 82 that each are inserted in the positioning hole 221 of the fixing portion 22 and are screwed to the bumper 1 may be used. In the example in FIGS. 15A and 15B, four tube-shaped screwing protrusions 13, in each of which a thread groove is provided on the inner peripheral face and the screw 82 is screwed thereto, are provided on the inside-face of the bumper 1 so as to surround the exposure hole 11 from four side.

Figure 16A:
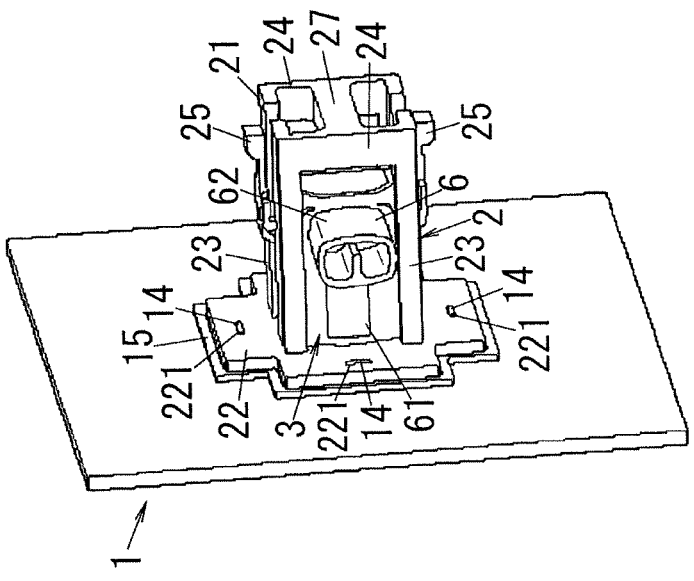
FIGS. 16A and 16B are perspective views illustrating a method for positioning the ultrasonic sensor of Embodiment 2 relative to the bumper.
Figure 16B:
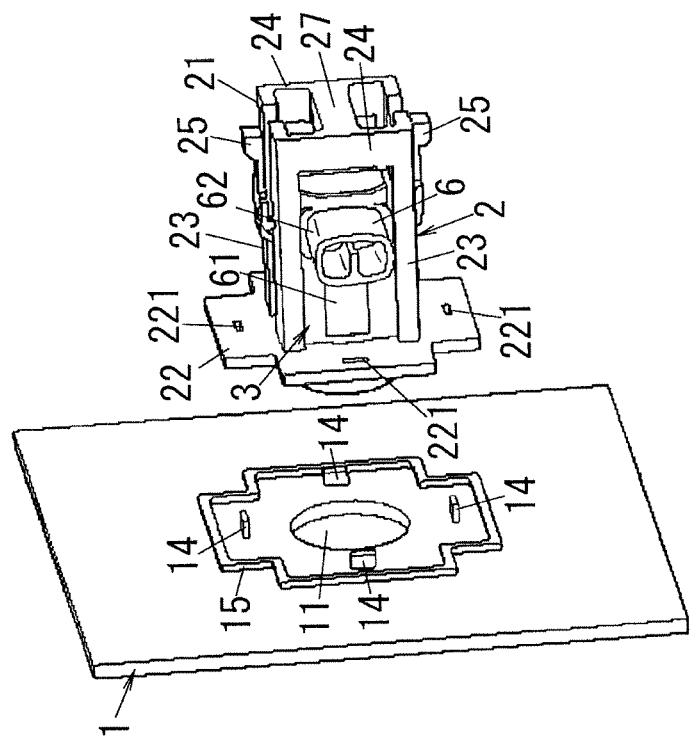

Also, for positioning the mount 2 relative to the bumper 1, as shown in FIGS. 16A and 16B, a marking line 15 with the shape of the fixing portion 22 may be drawn on the inside-face of the bumper 1, or positioning protrusions 14 that are inserted into the positioning holes 221 of the fixing portion 22 may be provided on the inside-face of the bumper 1. In particular, when the exposure hole 11 has a circular shape, the adhesive sheet 81 is used for fixing, and the direction of the connector portion 62 need to be strictly set, it is desirable that positioning is performed using the marking line 15 and the protrusions 14 described above. In the present embodiment, an outline of the front face 222 that is the end face facing the bumper 1 in the fixing portion 22 has a non-circular shape (cross shape). Accordingly, positioning around the axis by the marking line 15 is made possible. The marking line 15 is generally provided by a recess (groove) formed by using a marking gauge or the like, but the marking line 15 may be provided by a protrusion formed by using putty or the like.

Figure 17:
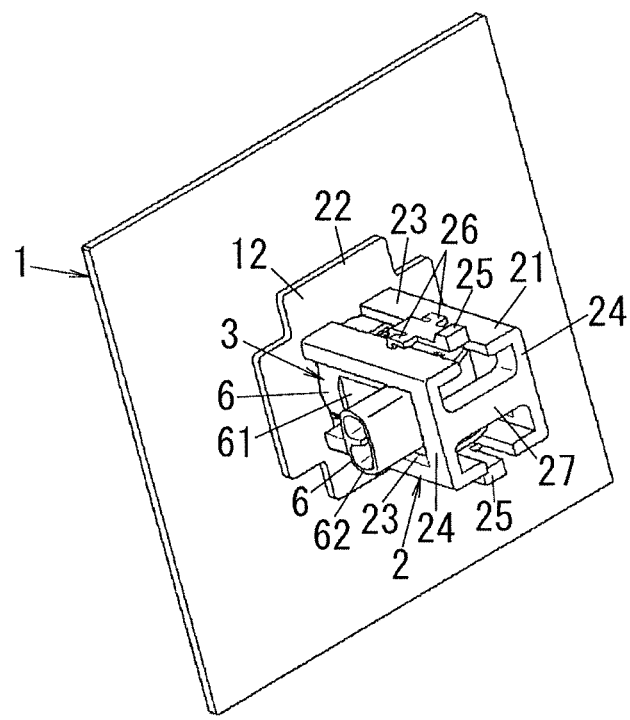
FIG. 17 is a perspective view illustrating a state in which the ultrasonic sensor of Embodiment 2 is fixed to the bumper when viewed from an inside of the bumper.

The holding portion 21 includes two sandwiching portions 23, one end portion (left end portion in FIG. 11) of each being coupled to the fixing portion 22, that sandwich therebetween the sensor body 3. In the present embodiment, each sandwiching portion 23 is constituted by a pair of plates 232 and 232. In each sandwiching portion 23, a slit 231 is formed between the pair of the plates 232 and 232. Two linking portions 24 are provided between the other end portions (between the right end portions in FIG. 11) of the two sandwiching portions 23 so as to maintain the distance between the sandwiching portions 23. Also, in the present embodiment, as shown in FIG. 17, a bridge portion 27 is provided between the linking portions 24. When there is an attempt to attach the sensor body 3 to the mount 2 from the rear (from the right in FIG. 11), the sensor body 3 cannot be attached due to interference with the bridge portion 27, or the like. That is, the sensor body 3 can be coupled to the mount 2 from only the front side (the side to be oriented toward the inside-face 101 of the bumper 1).

As shown in FIG. 11, a clip portion 25 is arranged in the slit 232 in each of the sandwiching portions 23. Each clip portion 25 has an elongated shape in the projecting direction in which the sandwiching portion 23 projects from the fixing portion 22 (left-right direction in FIG. 11). Due to the center portion of the clip portion 25 in the lengthwise direction being linked to the sandwiching portion 23 via elastically deformable spring portions 26, the clip portion 25 is elastically swingable relative to the sandwiching portion 23 (that is, relative to the fixing portion 22). Also, each clip portion 25 is formed with a step 251 such that the end portion thereof (left end portion in FIG. 11) near the fixing portion 22 is located closer to the sensor body 3 (inner side in the front-rear direction in FIG. 11) than other portions thereof in a state in which the spring portions 26 are elastically returned. In each clip portion 25, an engaging hole 250 is provided in a portion on the fixing portion 22 side (left side in FIG. 11) relative to the step 251. Further, in the body portion 61 of the body 6, engaging protrusions 31 are provided on faces that oppose the respective clip portions 25. Each engaging protrusion 31 has a truncated pyramid shape in which the rear face thereof is sloped such that the cross-sectional area in a cross-section orthogonal to the projection direction decreases toward the tip end thereof.

That is to say, the mount 2 is provided with one of the engaging hole 250 and the engaging protrusion 31, and the sensor body 3 is provided with the other of the engaging hole 250 and the engaging protrusion 31 so as to engage with each other to generate coupling force between the mount 2 and the sensor body 3 at a position at which the dimension of protrusion of the sensor body 3 from the end face of the mount 2 that faces the inside-face 101 of the bumper 1 matches the thickness of the bumper 1.

Specifically, the mount 2 includes the fixing portion 22 that is to be fixed to the bumper 1, and the clip portion 25 that is elastically swingable relative to the fixing portion 22 upon receiving operation force. One of the engaging hole 250 and the engaging protrusion 31 is provided on one of the clip portion 25 and the outer face of the sensor body 3, and the other of the engaging hole 250 and the engaging protrusion 31 is provided on the other of the clip portion 25 and the outer face of the sensor body 3.

As described above, assembly of the sensor body 3 to the mount 2 is possible only through the insertion hole 220 of the fixing portion 22, and assembly from the reverse side is not possible due to the presence of the linking portions 24 and the bridge portion 27.

Here, the positions of the engaging protrusions 31 and the engaging holes 250 are designed such that, in a state in which the engaging protrusions 31 are inserted into the respective engaging holes 250 (hereinafter referred to as "coupled state"), the dimension of protrusion of the sensor body 3 from the end face of the fixing portion 22 that faces the bumper 1 is substantially equal to the thickness of the bumper 1. Accordingly, after the completion of attachment to the bumper 1, the end face (transducer face 41) of the sensor body 3 and the outside-face 102 of the bumper 1 are substantially flush with each other.

Further, in the body portion 61 of the body 6, temporary engagement protrusions 32 that can be inserted into the engaging holes 250 are provided on the rear side (right in FIG. 11) of the respective engaging protrusions 31. In the present embodiment, the engaging holes 250 serve as temporary engagement holes that engage with respective temporary engagement protrusions 32. In a state in which the temporary engagement protrusions 32 are inserted in the respective engaging holes (temporary engagement holes) 250 (hereinafter referred to as "temporarily coupled state"), the dimension of protrusion of the sensor body 3 from the front end face 222 of the mount 2 that faces the bumper 1 (that is, the stroke of insertion in the exposure hole 11) is larger than that in the coupled state.

Attachment to the bumper 1 may be performed by, as shown in FIG. 10A, inserting the sensor body 3 into the exposure hole 11 and fixing the mount 2 to the bumper 1 in the temporarily coupled state, and thereafter, pushing the sensor body 3 in the rearward direction (direction from the outside to the inside of the exposure hole 11, and the right side in FIG. 10) so as to move to the coupled state shown in FIG. 10B. In each engaging protrusion 31, the rear end portion (right end portion in FIG. 11) thereof is sloped such that the dimension of protrusion decreases toward the end. When the state is shifted from the temporarily coupled state to the coupled state, as described above, the clip portions 25 slide on the sloped faces of the respective engaging protrusions 31.

That is to say, the sensor body 3 is capable of parallel displacement relative to the mount 2 so as to increase the dimension of protrusion of the sensor body 3 outward from the bumper 1 compared to the position at which the engaging holes 250 and the engaging protrusions 31 are engaged with each other, and the sensor body 3 is provided with one of the temporary engagement holes 250 and the temporary engagement protrusions 32, and the mount 2 is provided with the other of the temporary engagement holes 250 and the temporary engagement protrusions 32, the temporary engagement holes 250 and the temporary engagement protrusions 32 being configured to engage with each other in a state in which the sensor body 3 is displaced in parallel relative to the mount 2 so as to increase the dimension of protrusion outward from the bumper 1 compared to the position at which the engaging holes 250 and the engaging protrusions 31 are engaged with each other.

According to the above configuration, since coupling force for coupling to the bumper 1 is generated only in the mount 2, the entirety of which is located on the inside-face side of the bumper 1, the dimension of protrusion of the ultrasonic sensor outward from the bumper 1 can be reduced compared with a case where the coupling force is generated by sandwiching the bumper 1 from inside and outside thereof as shown in the example in FIG. 43. Also, the sensor body 3 can be inserted into the exposure hole 11 in the temporarily coupled state in which the dimension of protrusion of the sensor body 3 from the mount 2 is larger than that in the coupled state, positioning of the mount 2 with respect to the bumper 1 is facilitated.

Also, in the present embodiment, the temporary engagement protrusions 32 have a convex (round, for example) shape at least in the front-rear direction (that is, the direction for changing the distance from the bumper 1) such that the dimension of protrusion thereof gradually decreases from the center toward the two ends. Also, the dimension of protrusion of the temporary engagement protrusions 32 from the body portion 61 is set to be smaller than the dimension of protrusion of the engaging protrusions 31 from the body portion 61.

Figure 18A:
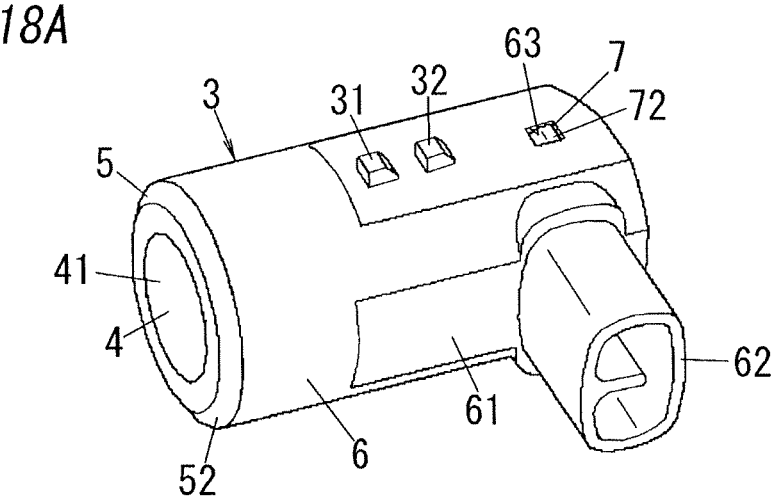
FIGS. 18A and 18B are perspective views illustrating modified modes of a sensor body of the ultrasonic sensor of Embodiment 2.

Note that, as a first modified mode shown in FIG. 18A, the temporary engagement protrusion 32 may have a truncated pyramid shape similar to the engaging protrusion 31. However, operation force required for shifting from the temporarily coupled state to the coupled state can be made smaller when the dimension of protrusion of the temporary engagement protrusions 32 is made smaller than the dimension of protrusion of the engaging protrusions 31, as shown in FIG. 11.

That is to say, it is preferable that the temporary engagement protrusions 32 have a truncated pyramid shape or a round shape.

Figure 18B:
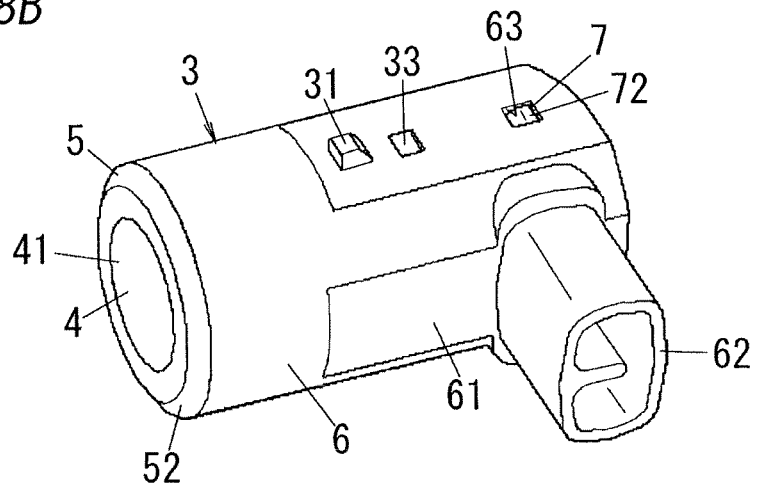

Also, as a second modified mode shown in FIG. 18B, the sensor body 3 may be provided with the temporary engagement holes 33, and the temporary engagement protrusion (not shown) that is inserted to the corresponding temporary engagement hole 33 in the temporarily coupled state may be provided, for example, on the clip portions 25 of the mount 2. However, the structure can be simplified when, similarly to the engaging holes 250 in the present embodiment, one of the engaging protrusion and the engaging hole serves as the temporary engagement protrusion or the temporary engagement hole.

Figure 19:
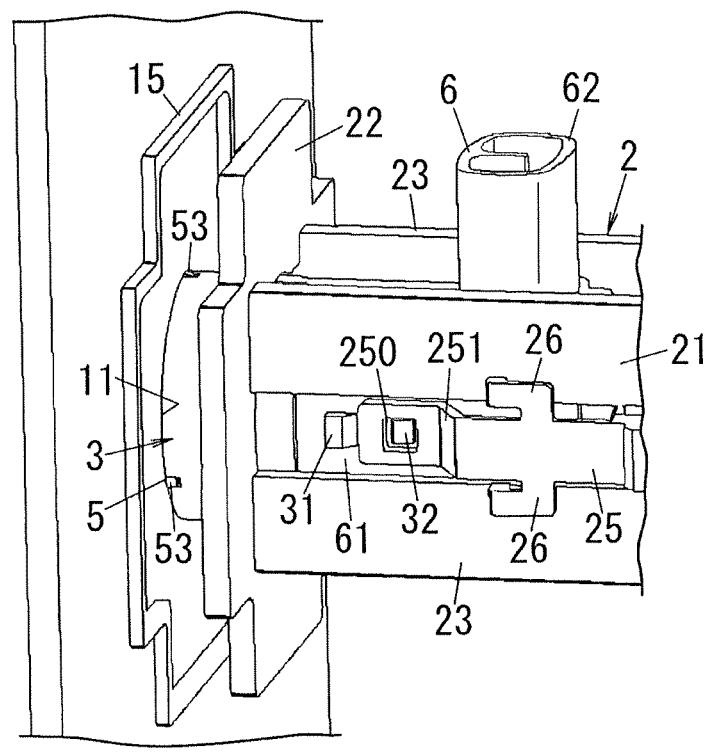
FIG. 19 is a perspective view illustrating main portions in a third modified mode of the ultrasonic sensor of Embodiment 2 in a process for being fixed to the bumper.
Figure 20:
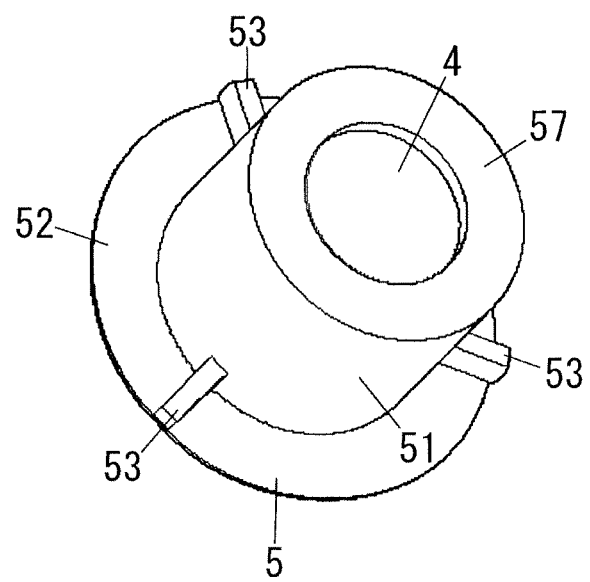
FIG. 20 is a perspective view illustrating a transmission/reception block that is covered by a holding rubber in the third modified mode of the ultrasonic sensor of Embodiment 2.
Figure 21:
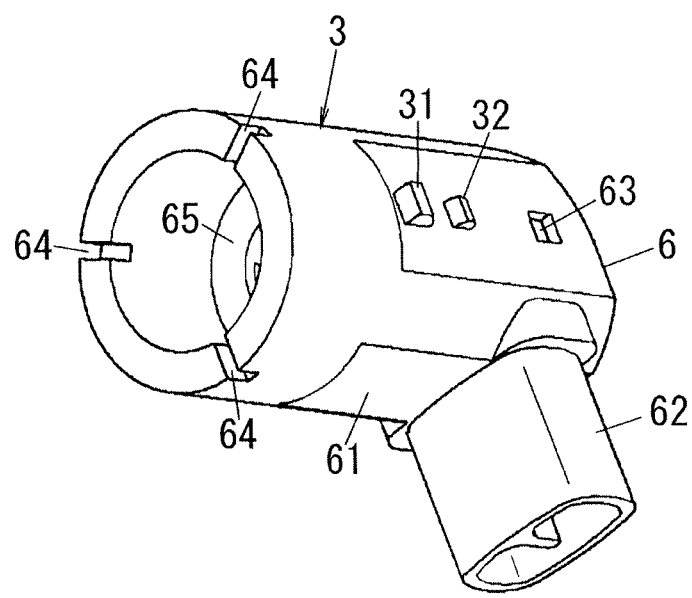
FIG. 21 is a perspective view illustrating a body in the third modified mode of the ultrasonic sensor of Embodiment 2.
Figure 22:
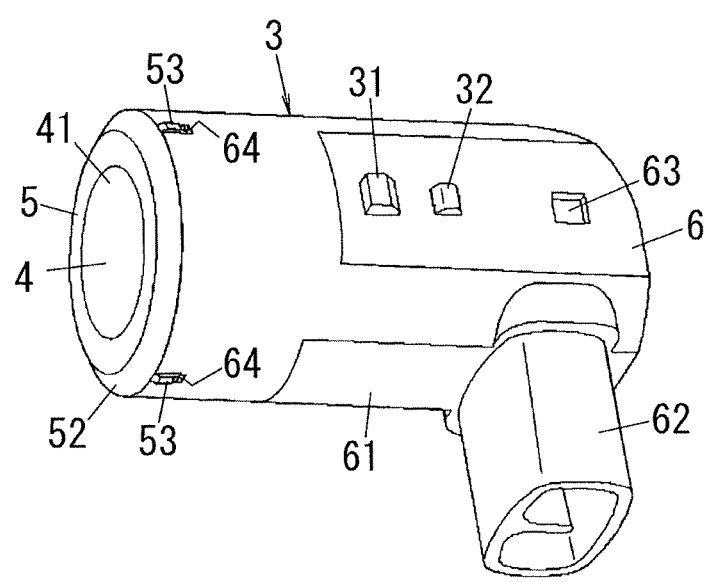
FIG. 22 is a perspective view illustrating a sensor body in the third modified mode of the ultrasonic sensor of Embodiment 2.

A third modified mode of the present embodiment is shown in FIGS. 19 to 22. In the present modified mode, as shown in FIG. 19, the sensor body 3 is provided with elastic contact protrusions 53 that are made of an elastic material and are brought into elastic contact with the inner peripheral face of the exposure hole 11 in a state in which the sensor body 3 is attached to the bumper 1. In particular, the elastic contact protrusions 53 are provided on the outer peripheral face of the holding rubber 5, as shown in FIG. 20, and the body portion 61 of the body 6 is provided with cutouts 64 into which the elastic contact protrusions 53 are inserted, as shown in FIG. 21. Accordingly, the elastic contact protrusions 53 protrude from the body portion 61 of the body 6 in the radial direction thereof, as shown in FIG. 22. In the present modified mode, the outer diameter of the flange portion 52 of the holding rubber 5 is made larger than the outer diameter of the body portion 61 of the body 6, and the elastic contact protrusions 53 are linked to the flange portion 52 and the outer peripheral face of the body portion 51. Also, three elastic contact protrusions 53 are provided at equal intervals of about 120 degrees in the circumferential direction of the body portion 51. That is, the sensor body 3 is provided with the elastic contact protrusions 53 that are brought into elastic contact with the inner peripheral face of the exposure hole 11 in a state in which the sensor body is attached to the bumper 1. By adopting the above configuration, rattling of the sensor body 3 against the bumper 1 is suppressed.

Note that, as shown in FIGS. 20 and 21, in the ultrasonic sensor of the present embodiment as well, bottom portions 57 and 65 are provided on the holding rubber 5 and the body 6, respectively, for preventing the transmission/reception block 4 from falling. The bottom portions 57 and 65 each have a ring shape, and the peripheries thereof are linked to the body portions 51 and 61, respectively, and wiring (not shown) to be connected to the transmission/reception block 4 is inserted in the bottom portions 57 and 65.

Figure 23:
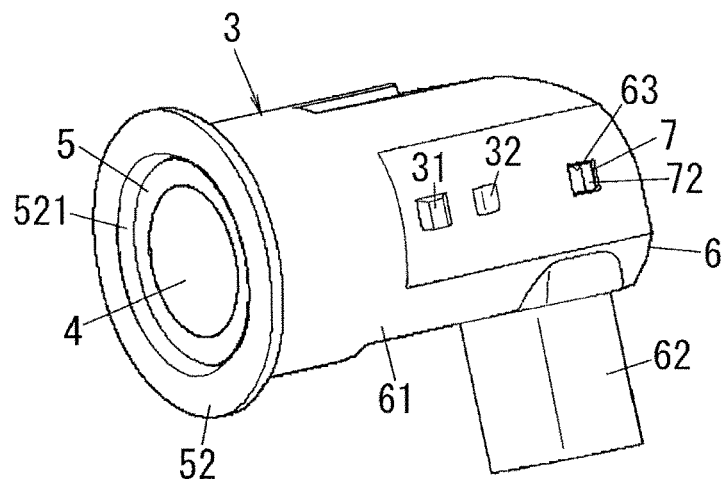
FIG. 23 is a perspective view illustrating a sensor body in a fourth modified mode of the ultrasonic sensor of Embodiment 2.
Figure 24:
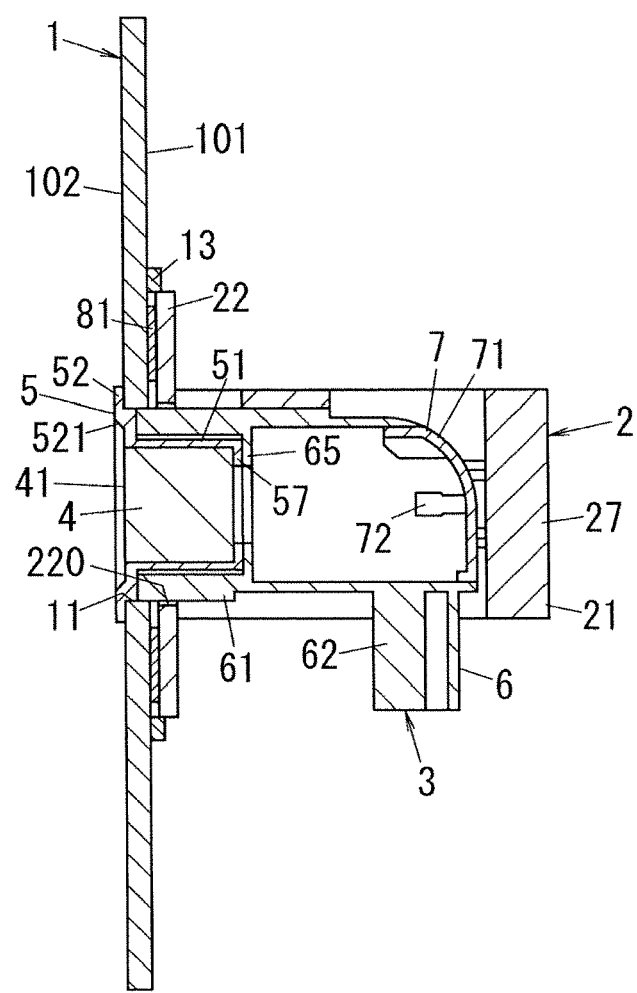
FIG. 24 is a cross-section illustrating a state in which the ultrasonic sensor is attached to the bumper in the fourth modified mode of the ultrasonic sensor of Embodiment 2.
Figure 25:
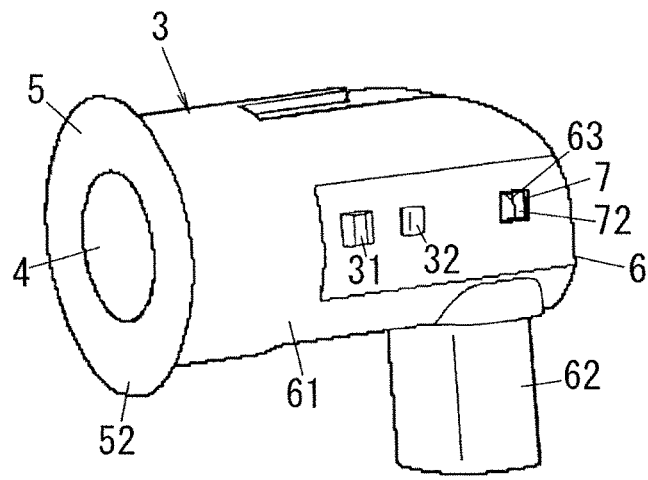
FIG. 25 is a perspective view illustrating a sensor body in a fifth modified mode of the ultrasonic sensor of Embodiment 2.
Figure 26:
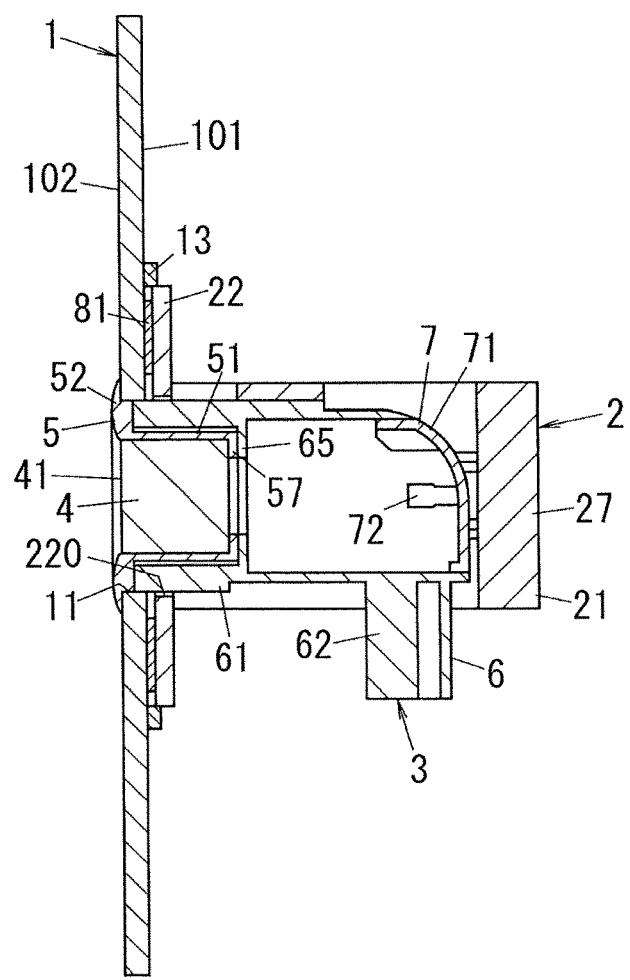
FIG. 26 is a cross-section illustrating a state in which the ultrasonic sensor is attached to the bumper in the fifth modified mode of the ultrasonic sensor of Embodiment 2.

A fourth modified mode of the present embodiment is shown in FIGS. 23 and 24, and a fifth modified mode of the present embodiment is shown in FIGS. 25 and 26. In the fourth modified mode and the fifth modified mode, the outer diameter of the flange portion 52 is made larger than the outer diameter of the body portion 61 of the body 6. In this case, when the inner diameter of the exposure hole 11 is made smaller than the outer diameter of the flange portion 52, and larger than the outer diameter of the body portion 61 of the body 6, the opening edge of the exposure hole 11 (gap between the inner peripheral face of the exposure hole 11 and the outer peripheral face of the body portion 61 of the body 6) can be covered by the flange portion 52 when viewed from the outside of the bumper 1, and the appearance can be improved. In a case where the inner diameter of the exposure hole 11 is set as described above, when the front end portion of the sensor body 3 is inserted into the exposure hole 11 from the inside (rear side) of the bumper 1, the flange portion 52 may be inserted into the exposure hole 11 while the flange portion 52 being elastically deformed.

In the fourth modified mode, the flange portion 52 is provided with a ring-shaped step 521 for positioning the outer peripheral portion of the flange portion 52 on the forward side relative to the inner peripheral portion of the flange portion 52. In a state in which the rear face of a portion of the flange portion 52 on the outer peripheral side relative to the step 521 is in contact with the front face 102 of the bumper 1, a portion of the front face of the flange portion 52 that is inward of the step 521 and the front face 41 of the sensor body 3 are flush with the outside-face (front face) 102 of the bumper 1.

Also, in the fifth modified mode, the front face of the flange portion 52 has a convex shape in which the thickness decreases with increasing proximity to the inner peripheral edge and the outer peripheral edge so as not to form a step between the front face of the flange portion 52 and the front face 41 of the transmission/reception block 4 and the front face 102 of the bumper 1 at the inner peripheral edge and the outer peripheral edge of the flange portion 52.

Also, in each of the above modes, it is desirable that a portion of the ultrasonic sensor exposed outside through the bumper 1 (that is, the front face of the transmission/reception block 4 and the flange portion 52 of the holding rubber 5) is colored with the same color as the color of the bumper 1 in order to make the ultrasonic sensor inconspicuous and improve the appearance when viewed from the outside of the bumper 1. Specifically, when the color of the bumper 1 to which the ultrasonic sensor is attached is determined, the front face 41 of the transmission/reception block 4 and the flange portion 52 of the holding rubber 5 are colored to that color.

Note that, the temporary engagement protrusions and the temporary engagement holes of the present embodiment may be applied to the ultrasonic sensor of Embodiment 1. Also, the configuration of the holding rubber 5 and the body 6 of the present embodiment may be applied to the ultrasonic sensor of Embodiment 1.

Embodiment 3

An ultrasonic sensor of the present embodiment will be described with reference to FIGS. 27 to 42. Note that constituent elements similar to those in Embodiment 1 or 2 are provided with the same reference numerals, and description thereof will be omitted as appropriate.

The ultrasonic sensor of the present embodiment has almost the same configuration as that of Embodiments 1 or 2, as shown in FIGS. 27 to 32, and the shape of a holding rubber 5 differs.

Figure 27:
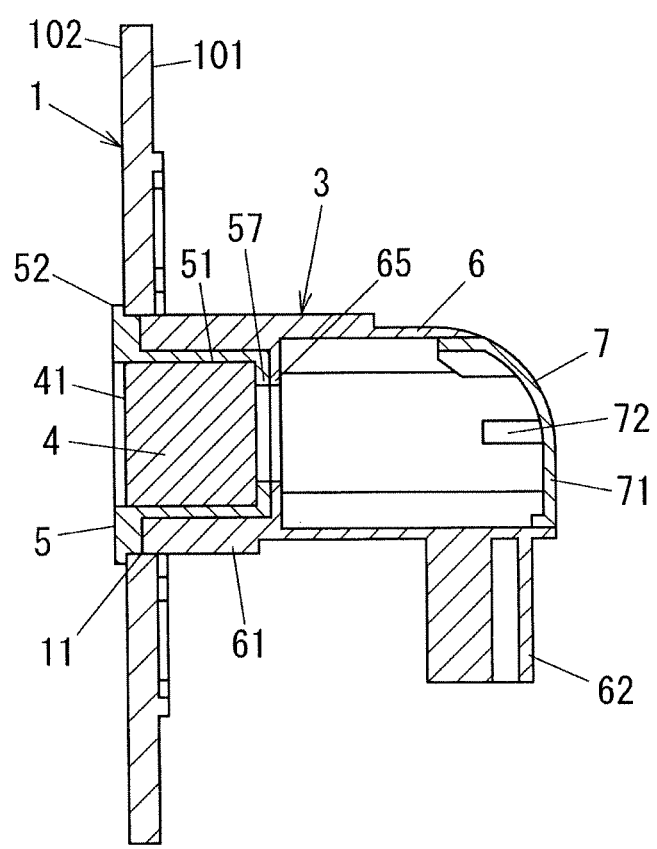
FIG. 27 is a cross-section illustrating a state in which an ultrasonic sensor of Embodiment 3 is attached to a bumper with a mount being omitted from illustration.
Figure 28:
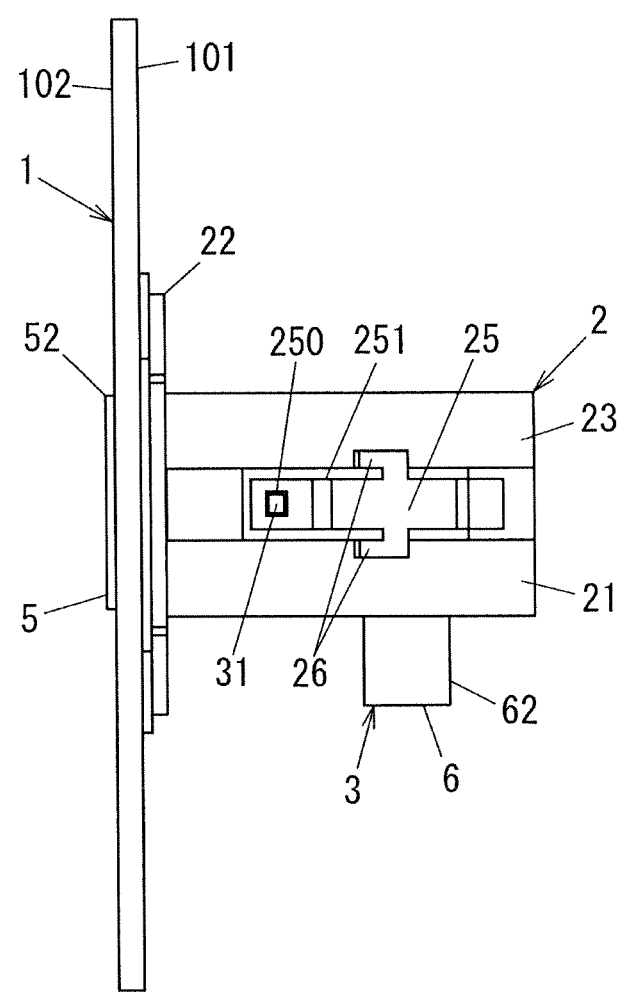
FIG. 28 is a side view illustrating a state in which the ultrasonic sensor of Embodiment 3 is attached to the bumper.
Figure 29:
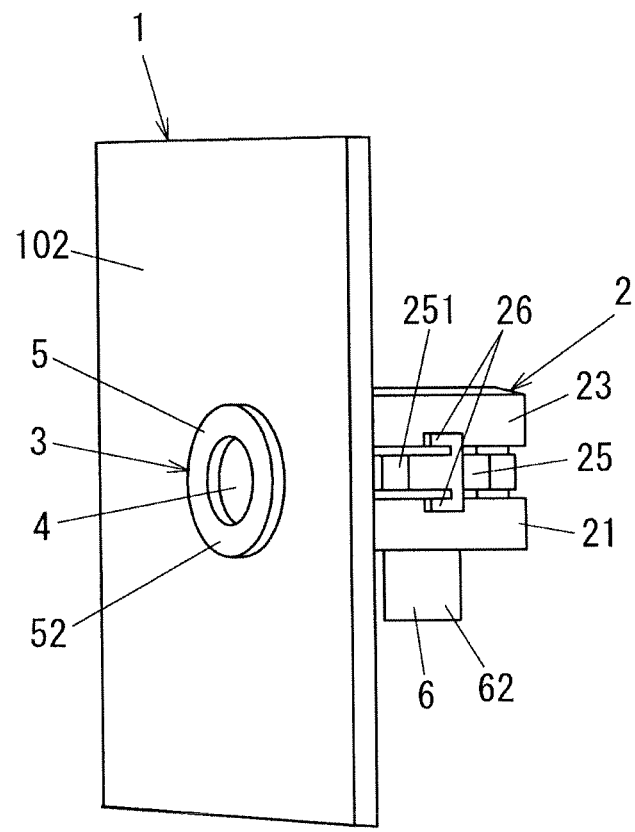
FIG. 29 is a perspective view illustrating a state in which the ultrasonic sensor of Embodiment 3 is attached to the bumper.
Figure 30:
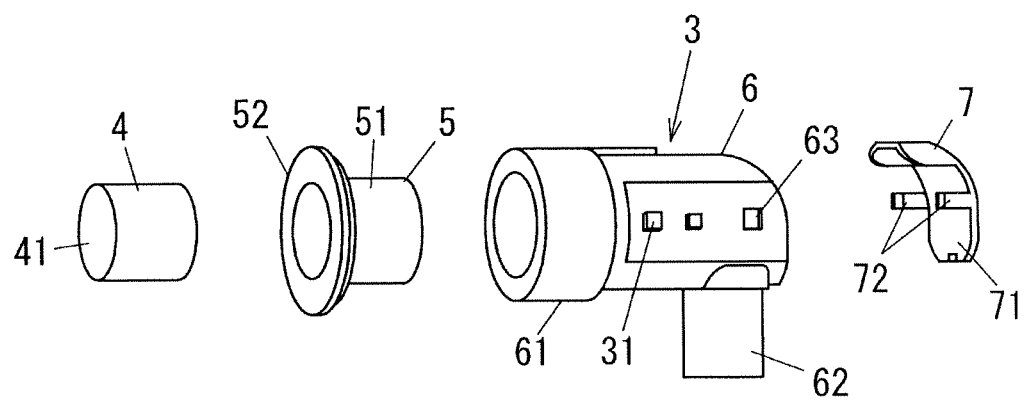
FIG. 30 is an exploded perspective view illustrating a sensor body of the ultrasonic sensor of Embodiment 3.
Figure 31:
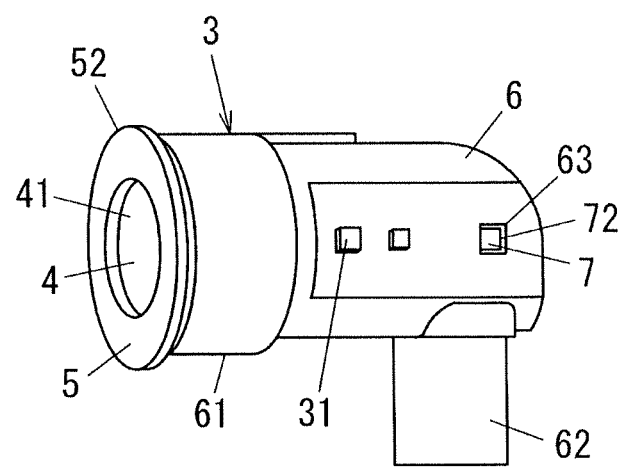
FIG. 31 is a perspective view illustrating the sensor body of the ultrasonic sensor of Embodiment 3.
Figure 32:
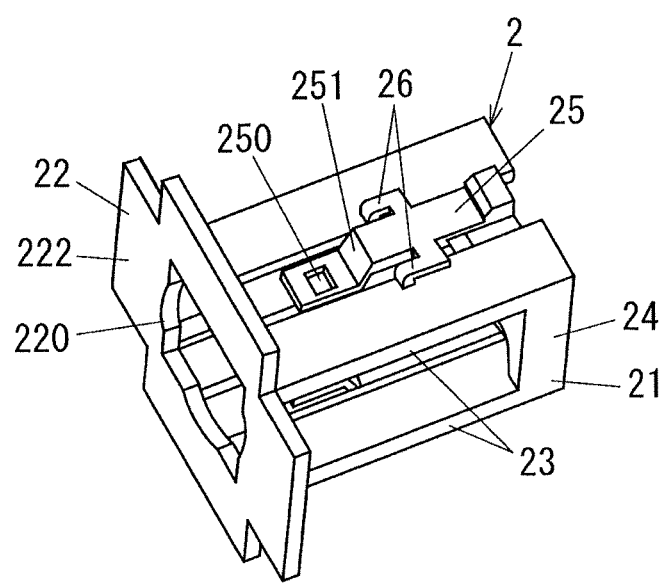
FIG. 32 is a perspective view illustrating a mount of the ultrasonic sensor of Embodiment 3.

In the present embodiment, the holding rubber 5 includes a flange portion 52 in which the outer diameter thereof is set to be larger than the outer diameter of the body 6. Also, the inner diameter of the exposure hole 11 is set to be smaller than the outer diameter of the flange portion 52 of the holding rubber 5 and to be larger than the outer diameter of the body portion 61 of the body 6. Accordingly, as shown in FIGS. 27 and 29, the opening edge of the exposure hole 11 is covered by the flange portion 52 when viewed from the outside of the bumper 1 (left side in FIG. 27), and therefore the appearance can be improved compared with a case where the opening edge of the exposure hole 11 is exposed. Also, since coupling force for coupling to the bumper 1 is generated only in the mount 2, the flange portion 52 is not required to have mechanical strength, and the thickness (dimension in the left-right direction in FIG. 27) of the flange portion 52 can be made smaller. As a result, the dimension of protrusion of the ultrasonic sensor outward from the bumper 1 is reduced compared with a case where the coupling force is generated by sandwiching the bumper 1 from inside and outside thereof, as the conventional example.

Figure 33:
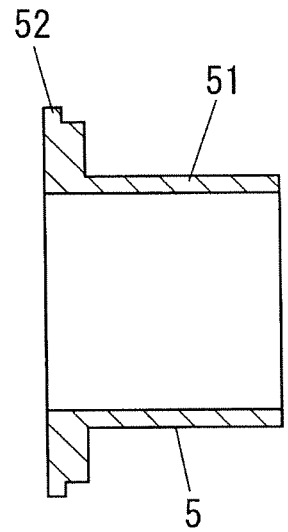
FIG. 33 is a cross-section illustrating a holding rubber of a comparative example.

Also, as shown in FIG. 27, bottom portions 57 and 65 are provided on the holding rubber 5 and the body 6, respectively, for preventing the transmission/reception block 4 from falling to the inside (rear side) of the bumper 1. The bottom portions 57 and 65 each have a ring shape, and the peripheries thereof are linked to the body portions 51 and 61, respectively, and wiring (not shown) to be connected to the transmission/reception block 4 is inserted in the bottom portions 57 and 65. Due to providing the bottom portion 57 described above on the holding rubber 5, the position of the transmission/reception block 4 is stabilized compared with a case where the bottom portion 57 is not provided, as shown in FIG. 33.

Figure 34:
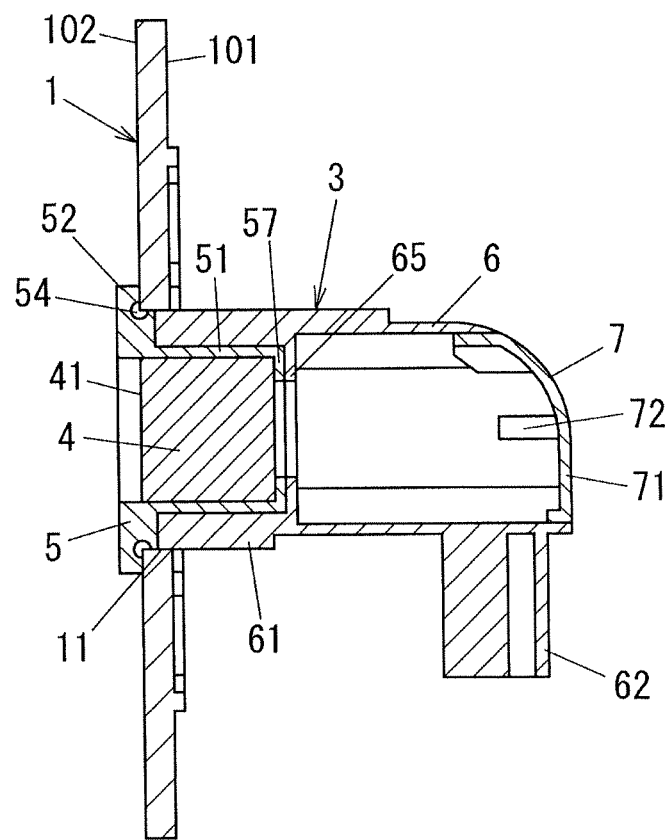
FIG. 34 is a cross-section illustrating the ultrasonic sensor in a state of being attached to the bumper with the mount being omitted from illustration in a first modified mode of the ultrasonic sensor of Embodiment 3.
Figure 35:
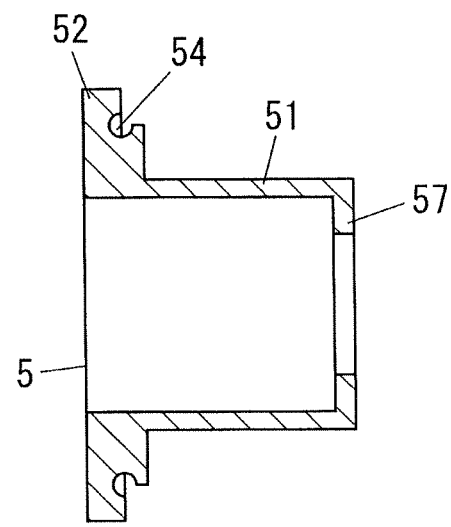
FIG. 35 is a cross-section illustrating a holding rubber in the first modified mode of the ultrasonic sensor of Embodiment 3.

A first modified mode of the present embodiment is shown in FIGS. 34 and 35. When the exposure hole 11 is produced in the bumper 1 by drilling, it is possible that protrusions referred to as burrs are formed at the opening edge of the exposure hole 11 protruding in the direction of passing through the exposure hole 11 (left-right direction in FIG. 27). In the present modified mode, as shown in FIGS. 34 and 35, a ring-shaped recess 54 is thereby provided in the rear face, which is the face facing the outside-face 102 of the bumper 1, in the flange portion 52 for avoiding the burrs. A ring-shaped cavity surrounding the holding rubber 5 is formed between the inner face of the ring-shaped recess 54 and the opening edge of the exposure hole 11, and the burrs are housed in the cavity. That is, the flange portion 52 is provided with the ring-shaped recess 54 that forms, along the periphery of the holding rubber 5, the ring-shaped cavity between the opening edge of the exposure hole 11 and the holding rubber 5. By providing the ring-shaped recess 54 described above, an operation to remove the burr described above by filing or the like is not required, thus improving the attachability.

Figure 36:
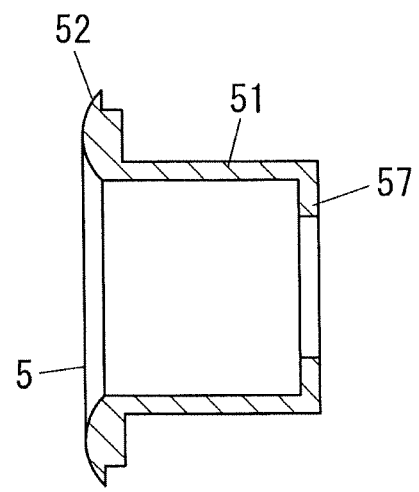
FIG. 36 is a cross-section illustrating the holding rubber in a second modified mode of the ultrasonic sensor of Embodiment 3.
Figure 37:
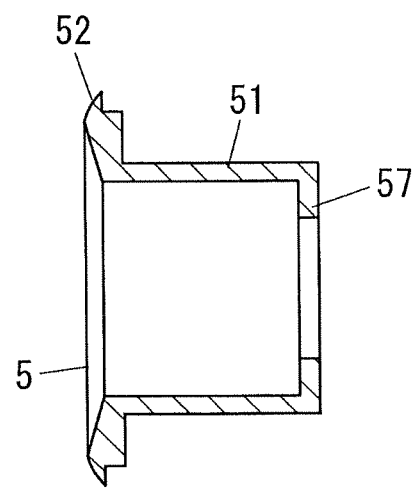
FIG. 37 is a cross-section illustrating the holding rubber in a third modified mode of the ultrasonic sensor of Embodiment 3.
Figure 38:
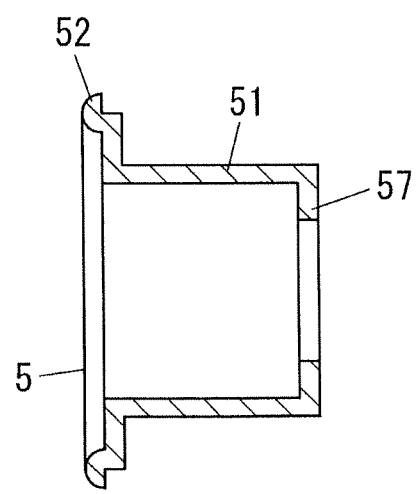
FIG. 38 is a cross-section illustrating the holding rubber in a fourth modified mode of the ultrasonic sensor of Embodiment 3.

A holding rubber 5 of a second modified mode of the present embodiment is shown in FIG. 36, a holding rubber 5 of a third modified mode of the present embodiment is shown in FIG. 37, and a holding rubber 5 of a fourth modified mode of the present embodiment is shown in FIG. 38. In these modified modes, the front end face that is the end face facing outward from the bumper 1 in the holding rubber 5 is made non-parallel with the outside-face (left face) 102 of the bumper 1.

In the second modified mode, as shown in FIG. 36, the front end face of the holding rubber 5 has a convex shape such that the dimension of protrusion in the forward direction decreases with increasing proximity to the inner peripheral edge and the outer peripheral edge. In the second modified mode, the cross-sectional shape of the front face of the flange portion 52 that is exposed outside the bumper 1 is an arc in a cross-section along the center axis of the transmission/reception block 4. That is, the cross-sectional shape of the flange portion 52 on the side exposed outside of the bumper 1 is an arc in a cross-section along the center axis of the transmission/reception block 4.

Also, in the third modified mode, as shown in FIG. 37, a center portion of the front end face of the holding rubber 5 has a truncated cone shape (bowl shape) in which the center portion is sloped such that the dimension of protrusion in the forward direction decreases toward the inner peripheral edge (that is, with increasing proximity to the transmission/reception block 4). That is, the holding rubber 5 has a portion that is exposed when viewed from the outside of the bumper 1, and a part, around the transmission/reception block 4, of the portion is sloped such that the dimension of protrusion from the outside-face 102 of the bumper 1 decreases with increasing proximity to the transmission/reception block 4.

Also, in the fourth modified mode, as shown in FIG. 38, only a ring-shaped region of the holding rubber 5 that is to be forward of the opening edge of the exposure hole 11 (that is, to be forward of the outer peripheral face of the body portion 61 of the body 6) protrudes in the forward direction with a minimum dimension and a shape capable of securing mechanical strength so as to minimize the volume of the portion that protrudes outward from the bumper 1.

The flange portion 52 has a ring shape in each of the modes described above.

Incidentally, it is desirable to suppress the propagation of vibration between the transmission/reception block 4 and the bumper 1 in order to suppress so-called reverberations that degrades accuracy of detection. As conceivable methods for suppressing the propagation of vibration between the transmission/reception block 4 and the bumper 1, there is a method in which the propagation of vibration via the body 6 is suppressed by reducing the area of contact between the holding rubber 5 and the body 6, and a method in which the propagation of vibration via the holding rubber 5 is suppressed by reducing the area of contact between the holding rubber 5 and the transmission/reception block 4.

Figure 39:
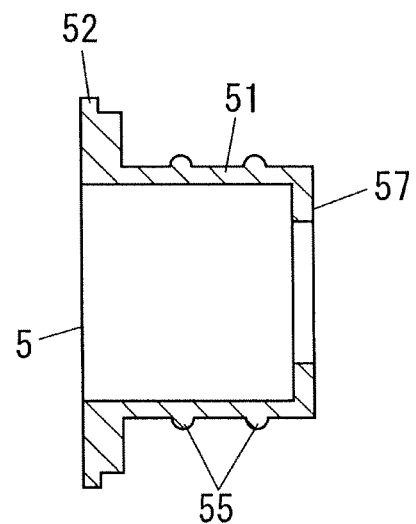
FIG. 39 is a cross-section illustrating the holding rubber in a fifth modified mode of the ultrasonic sensor of Embodiment 3.

A holding rubber 5 of the fifth modified mode of the present embodiment is shown in FIG. 39. In the fifth modified mode, in order to reduce the area of contact between the holding rubber 5 and the body 6, the outer peripheral face of the body portion 51 of the holding rubber 5 is provided with a plurality of outward protrusions 55, as shown in FIG. 39. As a result, the holding rubber 5 is brought into elastic contact with the inner peripheral face of the body portion 61 of the body 6 only at the outward protrusions 55. That is, the outer peripheral face of the holding rubber 5 is provided with a plurality of the outward protrusions 55 that are brought into elastic contact with the inner peripheral face of the body 6. It is preferable that the outward protrusions 55 are formed in a ring shape along the circumferential direction of the holding rubber 5. In the fifth modified mode, two ring-shaped outward protrusions 55 that each protrude outward in the radial direction over the whole circumference of the body portion 51 of the holding rubber 5 are provided side by side in the front-rear direction (left-right direction in FIG. 39) that is the axial direction of the body portion 51.

Figure 40:
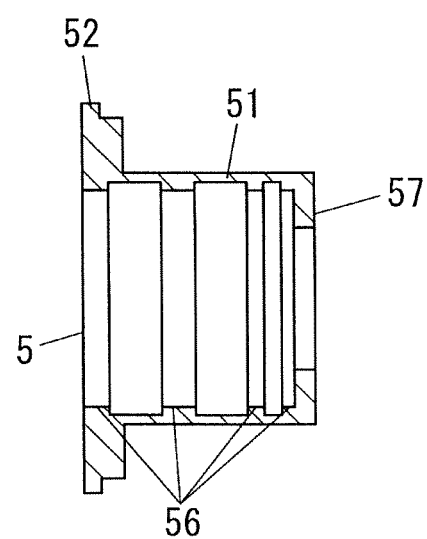
FIG. 40 is a cross-section illustrating the holding rubber in a sixth modified mode of the ultrasonic sensor of Embodiment 3.
Figure 41:
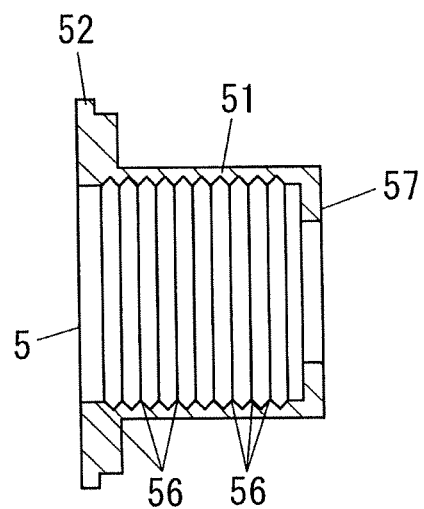
FIG. 41 is a cross-section illustrating the holding rubber in a seventh modified mode of the ultrasonic sensor of Embodiment 3.

A holding rubber 5 of the sixth modified mode of the present embodiment is shown in FIG. 40, and a holding rubber 5 of the seventh modified mode of the present embodiment is shown in FIG. 41.

In the sixth modified mode, in order to reduce the area of contact between the holding rubber 5 and the transmission/reception block 4, the inner peripheral face of the body portion 51 of the holding rubber 5 is provided with a plurality of inward protrusions 56, as shown in FIG. 40. As a result, the holding rubber 5 is brought into elastic contact with the outer peripheral face of the transmission/reception block 4 only at the inward protrusions 56. That is, the inner peripheral face of the holding rubber 5 is provided with a plurality of the inward protrusions 56 that are brought into elastic contact with the outer peripheral face of the transmission/reception block 4. It is preferable that the inward protrusions 56 are formed in a ring shape along the circumferential direction of the holding rubber 5. In the sixth modified mode, four ring-shaped inward protrusions 56 that each protrude inward in the radial direction over the whole circumference of the body portion 51 of the holding rubber 5 are provided side by side in the front-rear direction that is the axial direction of the body portion 51. The inward protrusion 56 at the rear end is linked to the bottom portion 57.

In the seventh modified mode, a plurality of inward protrusions 56 having a fixed shape are provided side by side in the axial direction of the body portion 51 at equal intervals, as shown in FIG. 41. That is, the holding rubber 5 includes a plurality of the inward protrusions 56 that are provided side by side at equal intervals. In the seventh modified mode shown in FIG. 41, nine inward protrusions 56 other than ones at the front and the back ends have the same shape and are provided at equal intervals (that is, periodically).

Also, in each of the above modes, it is desirable that a portion of the ultrasonic sensor exposed outside through the bumper 1 (that is, the front face 41 of the transmission/reception block 4 and the flange portion 52 of the holding rubber 5) is colored with the same color as the color of the bumper 1, in order to make the portion inconspicuous and improve the appearance of the bumper 1 when viewed from the outside of the bumper 1. Specifically, when the color of the bumper 1 to which the ultrasonic sensor is to be attached is determined, it is preferable that the front face 41 of the transmission/reception block 4 and the flange portion 52 of the holding rubber 5 are colored to that color.

Figure 42:
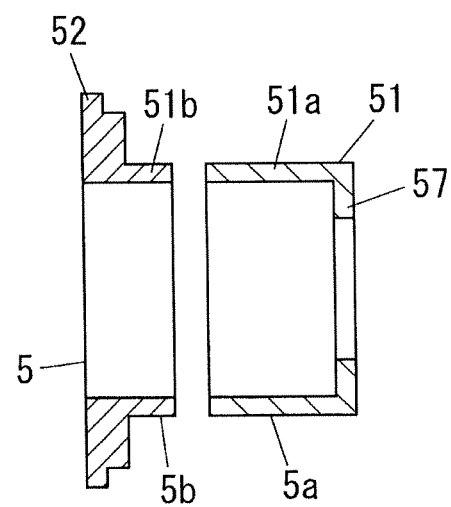
FIG. 42 is a cross-section illustrating the holding rubber in an eighth modified mode of the ultrasonic sensor of Embodiment 3.

In this case, as shown in FIG. 42, the holding rubber 5 may be configured by two parts, namely an inner-side holding rubber 5a and an outer-side holding rubber 5b that are divided in the front-rear direction, which is the direction of passing through the exposure hole 11. In an example in FIG. 42 (eighth modified mode), the outer-side holding rubber 5b has a flange portion 52 and a front portion (outside portion) 51b of a body portion 51, and the inner-side holding rubber 5a has the remaining portion (inside portion) 51a of the body portion 51 and a bottom portion 57. That is, the holding rubber 5 may be configured by the inner-side holding rubber 5a that is interposed between the body 6 and the transmission/reception block 4 over the whole circumference of the transmission/reception block 4, and the outer-side holding rubber 5b that has the flange portion 52 and covers the inner-side holding rubber 5a when viewed from the front side of the bumper 1. In this case, the outer-side holding rubber 5b covers the inner-side holding rubber 5a when viewed from outside (front side) of the bumper 1, and the color of the holding rubber 5 when viewed from the outside of the bumper 1 can be changed by replacing the outer-side holding rubber 5b.

The invention claimed is:

1. An ultrasonic sensor comprising:
   a mount that is fixed to a first face of a predetermined plate-shaped member having an exposure hole; and
   a sensor body that has at least one of a transmitter configured to transmit an ultrasonic wave and a receiver configured to receive an ultrasonic wave, is configured to be inserted into the exposure hole from a second face side of the plate-shaped member after the mount is fixed to the first face of the plate-shaped member, and is coupled to the mount so as to be exposed to the second face side of the plate-shaped member through the exposure hole,
   wherein the mount includes a plate-shaped fixing portion that is fixed to the first face of the plate-shaped member, and a holding portion that is coupled to the fixing portion, the fixing portion being provided with an insertion hole, the sensor body is configured to transmit and receive an ultrasonic wave with a transducer face, and
a body of the sensor body is constituted by a body portion and a connector portion, and outer diameters of the body portion and the connector portion are smaller than diameters of the insertion hole and the exposure hole, the sensor body having an outer shape that is capable of being inserted in the insertion hole,
the holding portion includes:
   sandwiching portions having first ends and second ends, the first ends being coupled to the fixing portion and having the sensor body disposed therebetween, the sandwiching portions being separated from each other; and
   linking portions provided between the second ends of the sandwiching portions, and
the holding portion holds the sensor body such that the body of the sensor body is positioned between the linking portions and the plate-shaped member in a direction of a longitudinal axis of the body of the sensor body with the transducer face exposed through the insertion hole.

2. The ultrasonic sensor according to claim 1,
wherein the mount includes the fixing portion that is fixed to the plate-shaped member, and a clip portion that is elastically swingable relative to the fixing portion upon receiving operation force, and
the clip portion is provided with one of a protrusion and a recess, and an outer face of the sensor body is provided with the other of the protrusion and the recess, the protrusion and the recess being configured to engage and disengage with each other according to a swing of the clip portion relative to the fixing portion.

3. The ultrasonic sensor according to claim 1,
wherein the mount is provided with one of an engaging hole and an engaging protrusion, and the sensor body is provided with the other of the engaging hole and the engaging protrusion, the engaging hole and the engaging protrusion being configured to engage with each other at a position in which a dimension of protrusion of the sensor body from an end face, facing the first face of the plate-shaped member, of the mount matches a thickness of the plate-shaped member to thereby generate coupling force between the mount and the sensor body,
the sensor body is capable of parallel displacement relative to the mount so as to increase the dimension of protrusion of the sensor body to the second face side of the plate-shaped member compared to the position at which the engaging hole and the engaging protrusion are engaged with each other, and
the sensor body is provided with one of a temporary engagement hole and a temporary engagement protrusion, and the mount is provided with the other of the temporary engagement hole and the temporary engagement protrusion, the temporary engagement hole and the temporary engagement protrusion being configured to engage with each other in a state in which the sensor body is displaced in parallel relative to the mount so as to increase the dimension of protrusion to the second face side of the plate-shaped member compared to the position at which the engaging hole and the engaging protrusion are engaged with each other.

4. The ultrasonic sensor according to claim 3, wherein the mount has a dimension and a shape such that the sensor body is coupled thereto only from a side of the mount that faces the first face of the plate-shaped member.

5. The ultrasonic sensor according to claim 3,
wherein the mount includes the fixing portion that is fixed to the plate-shaped member, and a clip portion that is elastically swingable relative to the fixing portion upon receiving operation force, and
the clip portion is provided with one of the engaging hole and the engaging protrusion, and an outer face of the sensor body is provided with the other of the engaging hole and the engaging protrusion.

6. The ultrasonic sensor according to claim 1, wherein an outline of an end face of the mount that faces the first face of the plate-shaped member is non-circular.

7. The ultrasonic sensor according to claim 1, wherein the mount is provided with a hole for positioning relative to the plate-shaped member.

8. The ultrasonic sensor according to claim 1, wherein the sensor body is provided with an elastic contact protrusion that is brought into elastic contact with an inner peripheral face of the exposure hole in a state in which the sensor body is attached to the plate-shaped member.

9. The ultrasonic sensor according to claim 1, wherein an outer peripheral face of the sensor body has, on a side of the sensor body exposed through the exposure hole, an end portion made of an elastic material, the end portion being sloped such that a cross-sectional area in a cross section parallel to the second face of the plate-shaped member increases from the first face side of the plate-shaped member toward the second face side.

10. The ultrasonic sensor according to claim 1, wherein the sensor body has an outer peripheral face of which an end portion on a side to be exposed through the exposure hole is sloped such that the outer size thereof increases gradually from the second face side of the plate-shaped member toward the first face side.

11. The ultrasonic sensor according to claim 1, wherein the sensor body has a flange portion that is made of an elastic material and covers an opening edge of the exposure hole when viewed from the second face side of the plate-shaped member.

12. The ultrasonic sensor according to claim 1,
wherein the sensor body includes a transmission/reception block that has at least one of the transmitter and the receiver, a body that surrounds the transmission/reception block when viewed from a direction of passing through the exposure hole, and a holding rubber that is made of an elastic material and is interposed between the body and the transmission/reception block over the whole circumference of the transmission/reception block, and
the holding rubber has a flange portion that covers an opening edge of the exposure hole when viewed from the second face side of the plate-shaped member.

13. The ultrasonic sensor according to claim 12,
wherein the transmission/reception block has a columnar shape, and
a cross-sectional shape of the flange portion on the side exposed through the exposure hole is an arc in a cross-section along an center axis of the transmission/reception block.

14. The ultrasonic sensor according to claim 12, wherein the flange portion has a ring shape.

15. The ultrasonic sensor according to claim 12, wherein the holding rubber has a portion that is exposed when viewed from the second face side of the plate-shaped member, and a part, around the transmission/reception block, of the portion is sloped such that a dimension of protrusion from the second face of the plate-shaped member decreases with increasing proximity to the transmission/reception block.

16. The ultrasonic sensor according to claim 12, wherein the flange portion is provided with a ring-shaped recess for forming, along the periphery of the holding rubber, a ring-shaped cavity between the opening edge of the exposure hole and the flange portion.

17. The ultrasonic sensor according to claim 12, wherein the holding rubber has a bottom portion that is in contact with the transmission/reception block and prevents the transmission/reception block from falling to a rear side of the plate-shaped member.

18. The ultrasonic sensor according to claim 1,
wherein a side face of the sensor body is provided with one of an engaging recess and an engaging protrusion, and the holding portion is provided with the other of the engaging recess and the engaging protrusion,
the ultrasonic sensor is configured such that the sensor body is attached to the holding portion by engaging the engaging recess and the engaging protrusion with each other, and
the ultrasonic sensor is configured so that when the sensor body is attached to the holding portion, the transducer face of the sensor body protrudes from the insertion hole of the fixing portion by a predetermined amount.

19. The ultrasonic sensor according to claim 18,
wherein the holding portion includes a clip portion that is elastically swingable relative to the fixing portion,
a side face of the sensor body is provided with one of the engaging recess and the engaging protrusion, and the clip portion is provided with the other of the engaging recess and the engaging protrusion, and
the engaging recess and the engaging protrusion are engaged and disengaged by swinging the clip portion.

20. The ultrasonic sensor according to claim 1, wherein an end of the connector portion extends beyond a side surface of at least one of the sandwiching portions.

21. The ultrasonic sensor according to claim 1, wherein the holding portion limits rearward movement of the sensor body relative to the second face side of the plate-shaped member such that the sensor body is only removable from the holding portion through the exposure hole via the second face side of the plate shaped member.

22. An ultrasonic sensor comprising:
a mount that is fixed to a first face of a predetermined plate-shaped member having an exposure hole; and
a sensor body that has at least one of a transmitter configured to transmit an ultrasonic wave and a receiver configured to receive an ultrasonic wave, is configured to be inserted into the exposure hole from a second face side of the plate-shaped member after the mount is fixed to the plate-shaped member, and is coupled to the mount so as to be exposed to the second face side of the plate-shaped member through the exposure hole,
wherein the mount includes a plate-shaped fixing portion that is fixed to the first face of the plate-shaped member, and a holding portion that is coupled to the fixing portion, the fixing portion being provided with an insertion hole,
the sensor body is configured to transmit and receive an ultrasonic wave with a transducer face,
a body of the sensor body is constituted by a body portion and a connector portion, and outer diameters of the body portion and the connector portion are made smaller than diameters of the insertion hole and the exposure hole, the sensor body having an outer shape that is capable of being inserted in the insertion hole,
the holding portion includes: sandwiching portions first ends of which are coupled to the fixing portion and which sandwiches therebetween the sensor body; and a linking portion provided between second ends of the sandwiching portions,
the connector portion of the sensor body is positioned in a region surrounded by the sandwiching portions and the linking portion, and
the holding portion holds the sensor body such that the body of the sensor body is positioned between the linking portions and the plate-shaped member in a direction of a longitudinal axis of the body of the sensor body with the transducer face exposed through the insertion hole.

23. An ultrasonic sensor comprising:
a mount that is fixed to a first face of a predetermined plate-shaped member having an exposure hole; and
a sensor body that has at least one of a transmitter configured to transmit an ultrasonic wave and a receiver configured to receive an ultrasonic wave, is configured to be inserted into the exposure hole from a second face side of the plate-shaped member after the mount is fixed to the plate-shaped member, and is coupled to the mount so as to be exposed to the second face side of the plate-shaped member through the exposure hole,
wherein the mount includes a plate-shaped fixing portion that is fixed to the first face of the plate-shaped member, and a holding portion that is coupled to the fixing portion, the fixing portion being provided with an insertion hole,
the sensor body is configured to transmit and receive an ultrasonic wave with a transducer face,
the holding portion is configured to hold the sensor body such that the transducer face is exposed through the insertion hole, and
a body of the sensor body is constituted by a body portion and a connector portion, and outer diameters of the body portion and the connector portion are made smaller than diameters of the insertion hole and the exposure hole, the sensor body having an outer shape that is capable of being inserted in the insertion hole,
each hole, except for the insertion hole, of the mount, has a size that prevents the body portion of the sensor body from passing therethrough.

* * * * *